United States Patent [19]

Kohno

[11] Patent Number: 5,783,250
[45] Date of Patent: Jul. 21, 1998

[54] GEL-COATED SEED PROCESSING METHOD AND APPARATUS THEREFOR

[75] Inventor: Yasushi Kohno, Susono, Japan

[73] Assignee: Yazaki Corporation, Tokyo, Japan

[21] Appl. No.: 757,938

[22] Filed: Nov. 27, 1996

[30] Foreign Application Priority Data

Nov. 29, 1995 [JP] Japan ................ 7-310702

[51] Int. Cl.⁶ ................................................ A01G 1/00
[52] U.S. Cl. ................... 427/4; 427/212; 427/337; 427/430.1; 118/30; 118/303; 118/500
[58] Field of Search ................ 427/4, 337, 212, 427/430.1; 118/303, 500, 30

[56] References Cited

U.S. PATENT DOCUMENTS

| | | |
|---|---|---|
| 4,238,523 | 12/1980 | Porter et al. ................. 427/4 |
| 4,806,357 | 2/1989 | Garrett et al. |
| 5,080,925 | 1/1992 | Kouno . |
| 5,107,787 | 4/1992 | Kouno ................. 118/23 |
| 5,254,358 | 10/1993 | Kouno et al. ............... 427/4 |
| 5,421,882 | 6/1995 | Kouno et al. |
| 5,509,963 | 4/1996 | Kohno ................. 118/23 |

FOREIGN PATENT DOCUMENTS 2 680 951  3/1993  France .

*Primary Examiner*—Janyce Bell
*Attorney, Agent, or Firm*—Armstrong, Westerman, Hattori, McLeland & Naughton

[57] ABSTRACT

A gel-coated seed processing method and an apparatus therefore capable of easily accommodating increased capacity of the apparatus to carry out a series of gel-coated seed processing consisting of coating seeds with gelatinization agent and curing the gelatinization agent to produce gel-coated seeds. The gel-coated seed processing method comprises the steps of: substantially linearly transporting seeds to be processed; coating the seeds to be processed with gelatinization agent at a destination to produce coated seeds; substantially linearly moving the coated seeds in curing agent while being immersed in the curing agent such that a direction that the coated seeds is transported in the curing agent when observed from above coincides with a direction that the seeds to be processed are transported when observed from above to harden the coated agent through reaction with the curing agent and obtain gel-coated seeds.

7 Claims, 19 Drawing Sheets

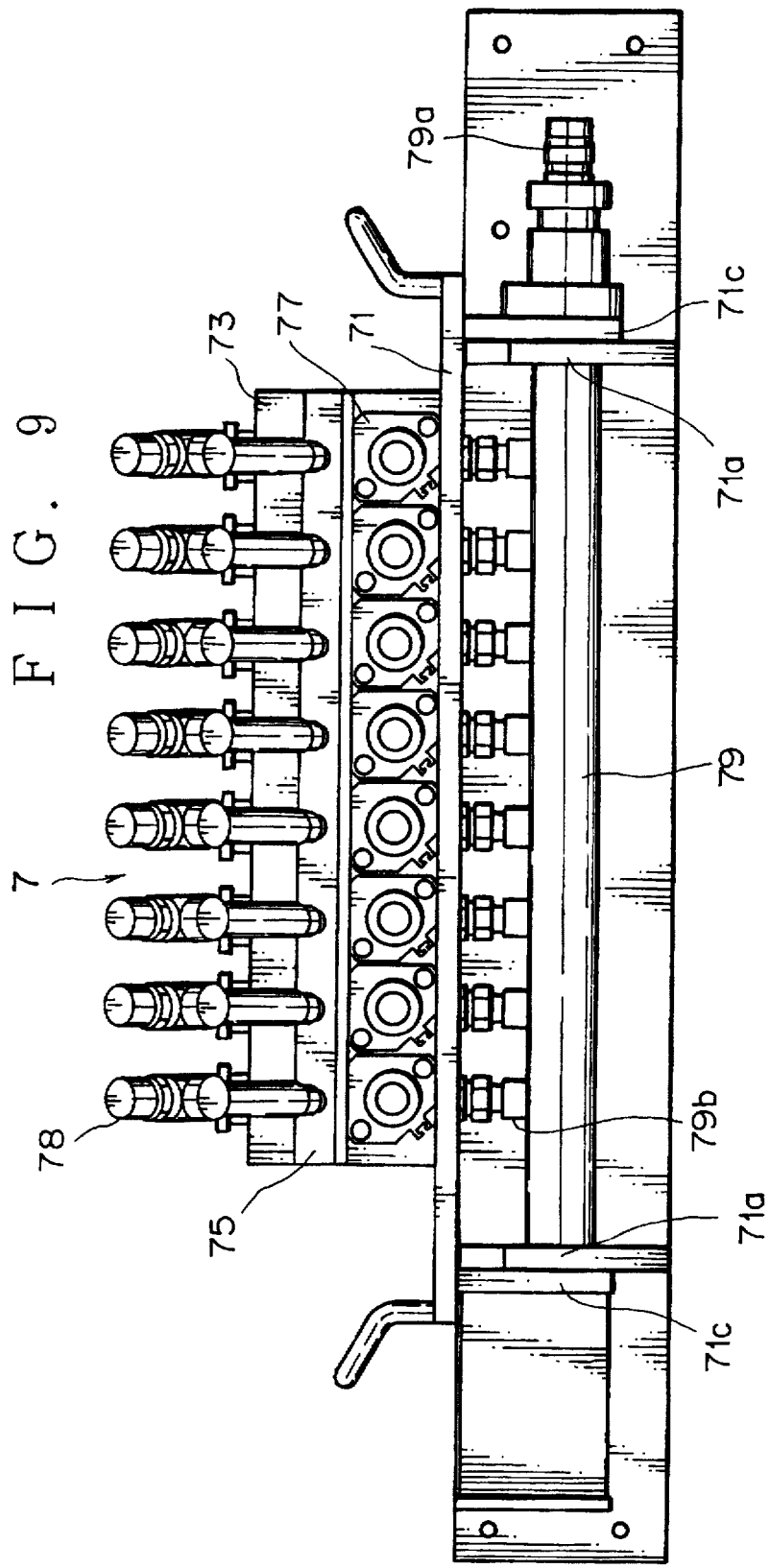

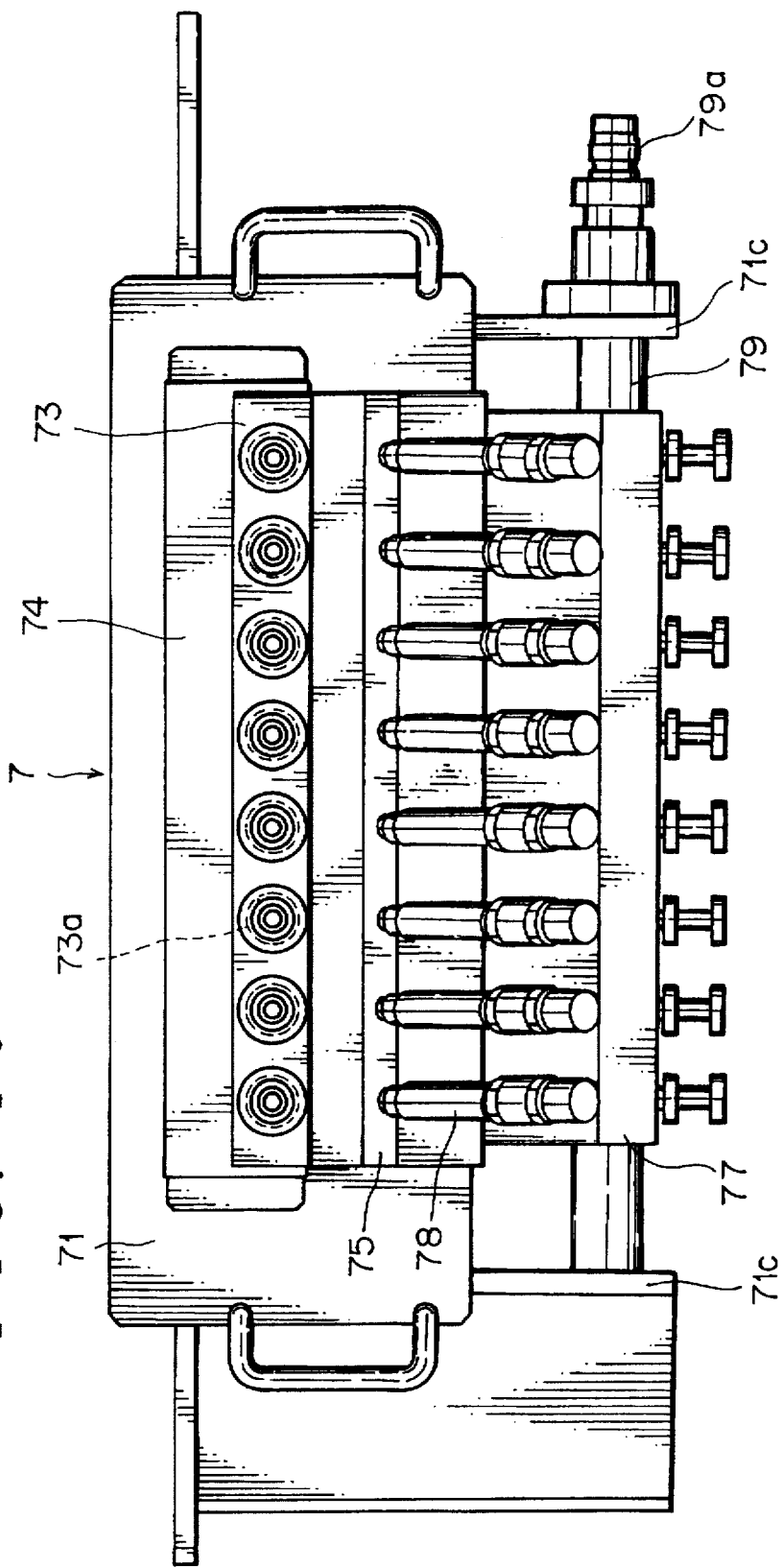

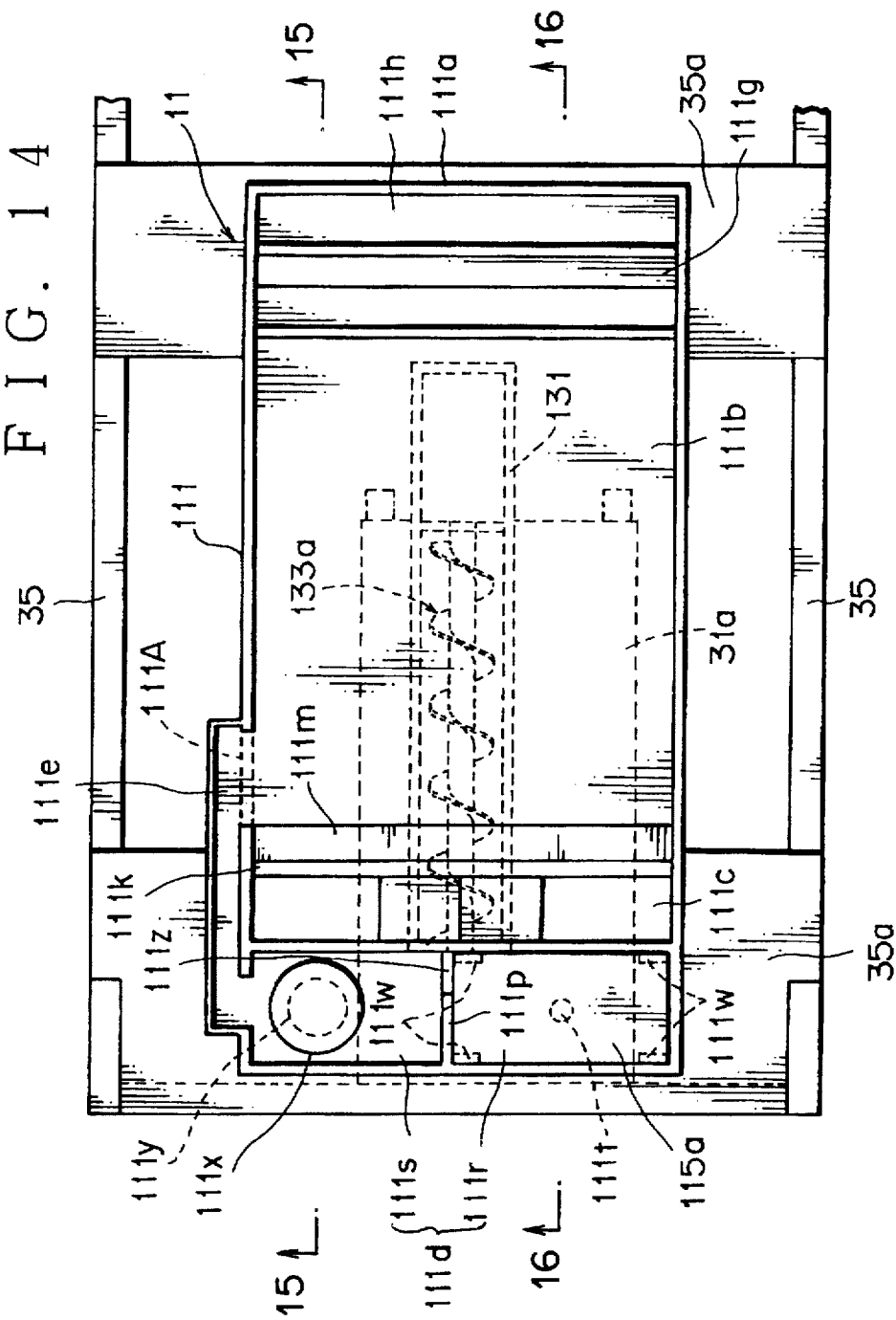

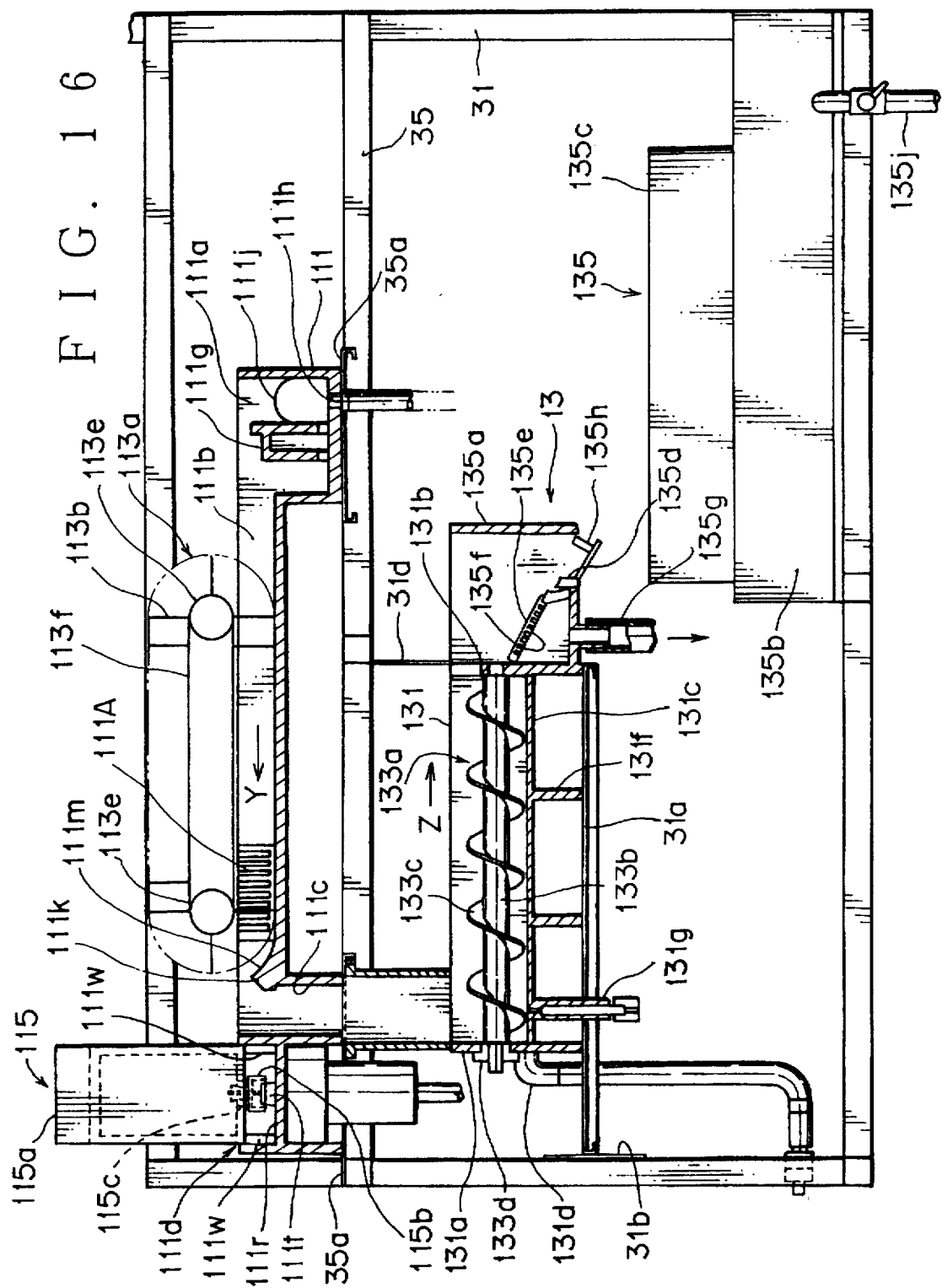

GEL-COATED SEED PROCESSING METHOD AND APPARATUS THEREFOR

BACKGROUND OF THE INVENTION

1. Field of the Invention

The present invention relates to a method of coating seeds with polymeric gel and an apparatus therefor.

2. Description of the Related Art

Conventionally, gel-coated seeds coated with resilient polymeric gel containing nutriments, germicidal agent and the like are known.

This gel-coated seeds have many advantages in that: the seeds are protected from being eaten by animals; the seeds are efficiently sterilized; the increase of the size of the seeds makes it easy to handle the seeds, resulting in easy sowing work; and absorption of the nutriments in the gel causes the germination ratio to be improved.

The present applicant has proposed a plurality of gel-coated seed processing apparatus capable of automatically manufacturing gel-coated seeds in consideration of many advantages described above.

FIG. 22 is a front view of a conventional gel-coated seed processing apparatus which was proposed by the present applicant, and a gel-coated seed processing apparatus, which is indicated by reference symbol A showing an overall apparatus in the figure, comprises a stand B, a seed hopper C, a seed transporting section D, a gelatinizing agent tank E, a gel processing section F, a curing vessel G and a washing vessel J.

The seed hopper C is vertically movably supported through an air cylinder C1 at the upper half portion of the stand B and at a portion slightly shifted toward one side with respect to a central portion in the transverse direction of the stand B, and the seed hopper C has a substantial round horizontal cross section with open upper end as illustrated in FIG. 23, and a bottom portion thereof is substantially conical and is gradually lowered toward the center thereof as illustrated in FIG. 22, and in the seed hopper C are accommodated a lot of seeds (not shown) which are to be coated with gel.

The gelatinizing agent tank E is disposed at the lower half portion of the stand B and at a portion slightly shifted toward the one side with respect to a central portion in the transverse direction of the stand B, and in the gelatinizing agent tank E is stored liquid gelatinizing agent with high viscosity which is used for coating the seeds.

The gel processing section F is mounted at the upper half portion of the stand B and at substantially central portion in the transverse direction of the stand B, and the gel processing section F is provided with a processing nozzle F1 with substantial double pipes therein.

To the inner pipe of the processing nozzle F1 are fed the seeds from the upper end thereof, and to the outer pipe thereof is fed gelatinizing agent in the gelatinizing agent tank E from the side of the processing nozzle F1 through a tube not shown.

Then, the gel processing section F is constructed in such a manner that, from the lower end of the inner pipe of the processing nozzle F1 is discharged one seed while discharging a predetermined amount of gelatinization agent from the lower end of the outer pipe by the movement of a plunger not shown in the processing nozzle F1 to drop under gravity the seed of which outer periphery is coated with the gelatinization agent.

The seed transporting section D is provided with a rotary actuator D1 which stands at the upper half portion of the stand B and between the seed hopper C and the processing nozzle F1; a long rotary arm D3 rotatably supported in a horizontal plane at a substantially intermediate portion thereof by the rotary actuator D1; and two disposable suction tips D5 and D7 which are detachably attached to both lower surfaces of the rotary arm D3.

The seed transporting section D is constructed such that, the rotary arm D3 is rotated 180° by 180° by the rotary actuator D1, which alternately and repeatedly change the conditions between the first condition, in which one tip D5 of the suction tips positions above the seed hopper C and the other tip D7 positions above the processing nozzle F1, and the second condition, in which the tip D5 positions above the processing nozzle F1 and the tip D7 positions above the seed hopper C.

The curing vessel G positions at a vertically substantially intermediate portion of the stand B and horizontally extends from the lower portion of the processing nozzle F1, where the seed coated with gelatinization agent on outer surface thereof drops under gravity, to a portion toward the other side of the stand B in the transverse direction thereof, and in the curing vessel G flows liquid curing agent which reacts with the gelatinization agent coating the seed and hardens the gelatinization agent to produce gel-coated seed from the coated seed.

In the curing vessel G, as illustrated in FIG. 23, a screw feeder G1 is rotatably accommodated to transport the gel-coated seeds from inside of the curing vessel G below the processing nozzle F1 to inside of the curing vessel G on the other side in the transverse direction of the stand B.

The washing vessel J is situated behind the curing vessel G and horizontally extends along the curing vessel G, and in the washing vessel J flows water for washing the gel-coated seeds of which gelatinization agent is hardened in the curing vessel G.

Further, in the washing vessel J, a screw feeder J1 is rotatably accommodated to transport the gel-coated seeds in a direction opposite to the direction that the gel-coated seeds are transported in curing vessel G.

In the conventional gel-coated seed processing apparatus A with the above-mentioned construction, the gel-coating process is carried out as follows.

At first, under the first condition of the seed transporting section D, a seed in the seed hopper C elevated by the air cylinder C1 is sucked by the tip D5 through depressurization therein. Next, after the seed hopper C is lowered by the air cylinder C1, the rotary arm D3 is horizontally rotated by the rotary actuator D1 by 180° to convert the seed transporting section D into the second condition.

Then, under the second condition, inside of the suction tip D5 is pressurized to feed the seed sucked to the inner pipe of the processing nozzle F1 from above, and simultaneously, the seed in the seed hopper C elevated by the air cylinder C1 is sucked by the suction tip D7 through depressurization therein, hereinafter, this motion is repeated to transport seeds to be transported from the seed hopper C to the processing nozzle F1.

After a seed is fed in the inner pipe of the processing nozzle F1 from above, in synchronization with this motion, the plunger is driven to discharge a prescribed amount of gelatinization agent together with the seed, and the seed coated with gelatinization agent on the outer surface thereof drops in the curing vessel G from the end of the processing nozzle F1 under gravity.

Further, the coated seed which drops in the curing vessel G is transported by the screw feeder G1, and the gelatinization agent coating the seed on the outer surface thereof is cured during the transportation to produce gel-coated seed, and the gel-coated seed which reaches a prescribed portion in the curing vessel G on the other side in the transverse direction of the stand B rides across a partition wall G3 (see FIG. 23) between the curing vessel G and the washing vessel J, and is transported on the washing vessel J side through rotation of the screw feeder G1 and air blown from air blowing spout not shown in synchronous with the rotation of the screw feeder G1.

Then, the gel-coated seeds transported to the washing vessel J are transported in the water in the washing vessel J through stream made by the screw feeder J1, and the surface of the gel-coated seeds are washed during the transportation, then the gel-coated seeds which reach the end of the washing vessel J after washed ride across the partition wall J3 (see FIG. 23) at the end of the washing vessel J through the screw feeder J1, and the gel-coated seeds are transported to an exit K (see FIG. 23) of the gel-coated seed to collect the seeds at a product receiver (not shown) which is mounted at the lower portion of the gel-coated seed processing apparatus A.

Further, remainder of the seeds in the seed hopper C is always watched to feed seeds in the seed hopper C when the remainder runs short.

SUMMARY OF THE INVENTION

With the gel-coated seed processing apparatus A with the aforementioned construction, although the seeds and the gel-coated seeds move substantially linearly in the curing vessel G and the washing vessel J respectively, at the seed transporting section D, the seeds are transported from the seed hopper C to the processing nozzle F1 while tracing a circular arc for instance, the directions that the seed and gel-coated seeds are transported scatter, in other words, the directions of the movement at those sections are inconsistent.

As a result, the maintenance of those sections must be carried out from different directions from each other in accordance with those of the motions of the sections, so that it is necessary to prepare spaces for maintenance around the side walls of the apparatus, which arises a problem that the installation space for the apparatus becomes large.

Further, the directions that maintenance works must be carried out vary with the section to be maintained, so that in case that a plurality of sections are to be maintained a worker must moves around the sides of the apparatus in accordance with the sections to be maintained, resulting in poor maintainability.

Still further, in the gel-coated seed processing apparatus A with the conventional construction, a method of alternately transporting seeds from the seed hopper C to the processing nozzle F1 by using the suction tips D5 and D7 at the both ends of the rotary arm D3 which is rotated by 180° by the rotary actuator D1 is adopted, therefore, there is a problem that a limit peculiar to the apparatus exists to increase the capacity of the apparatus itself by increasing the seed transporting capacity thereof.

The present invention has been made in consideration of the above-mentioned problems, and the first object thereof is to provide a gel-coated seed processing method capable of easily accommodating increased capacity of the apparatus to carry out a series of gel-coated seed processing consisting of coating seeds with gelatinization agent and curing the gelatinization agent to produce gel-coated seeds.

The second object of the present invention is to provide a gel-coated seed processing apparatus with the construction capable of preferably attaining the first object; preventing the increase of the installation space; and improving the maintainability of each section.

To accomplish the first object, a gel-coated seed processing method according to the present invention comprising the steps of: substantially linearly transporting seeds to be processed; coating the seeds to be processed with gelatinization agent at a destination to produce coated seeds; substantially linearly moving the coated seeds in curing agent while being immersed in the curing agent such that a direction that the coated seeds is transported in the curing agent when observed from above coincides with a direction that the seeds to be processed are transported when observed from above to harden the coated agent through reaction with the curing agent and obtain gel-coated seeds.

In the gel-coated seed processing method according to the present invention described above, after the coated seeds become gel-coated seeds through reaction with the curing agent, the gel-coated seeds are preferably washed in water while being transported therein in the direction that the seeds to be processed are transported when observed from upside.

Further, to accomplish the second object, a gel-coated seed processing apparatus according to the present invention comprises: seed transporting means for at least horizontally and substantially linearly transporting seeds to be processed; gel processing means for coating the seeds to be processed with gelatinizing agent to produce coated seeds at a destination of the seed transporting means and for feeding the coated seeds to curing agent in a curing vessel; and gel guide means for at least horizontally and substantially linearly transporting the coated seeds fed from the gel processing means in the curing agent, the gelatinizing agent being hardened through reaction with the curing agent during the transportation by the gel guide means to produce gel-coated seeds, wherein the gel guide means is disposed in relation to the seed transporting means and the gel processing means such that horizontal component of a vector showing movement, i.e. the direction of movement, of the coated seeds caused by the gel guide means coincides with horizontal component of a vector showing movement, i.e. the direction of movement, that the seeds to be processed are transported by the seed transporting means.

In the gel-coated seed processing apparatus described above, a plurality of the seed transporting means and a plurality of the gel processing means may be juxtaposed in a substantially horizontal direction crossing the horizontal component of the vector showing the movement that the seeds to be processed are transported, and the transportation of the seeds to be processed and the coating of the seeds to be processed with the gelatinizing agent may parallelly be carried out by the plurality of the seed transporting means and the gel processing means.

Further, in the gel-coated seed processing apparatus, the curing vessels are preferably disposed at suitable intervals in a substantially horizontal direction crossing the horizontal component of the vector showing the movement, i.e. the direction of movement, that the seeds to be processed are transported, and the curing vessels are preferably formed so as to have a dimension capable of accommodating a plurality of the coated seeds which are simultaneously fed, and the gel guide means simultaneously and parallelly transports the plurality of the coated seeds, which are situated at suitable intervals in the substantially horizontal direction, in the curing vessel in the direction of the horizontal component of the vector showing the movement, i.e. the direction of movement, of the coated seeds caused by the gel guide means.

Still further, it is preferable that the gel-coated seed processing apparatus described above further comprises a washing vessel with washing water therein to which the gel-coated seeds are fed, and second gel guide means for at least horizontally and substantially linearly transporting the gel-coated seeds in the washing water of the washing vessel, wherein the second guide means is disposed in relation to the gel processing means and the gel guide means such that horizontal component of a vector showing movement, the direction, that the gelatinizing agent is transported by the second guide means coincides with a horizontal component of a vector showing movement, i.e. the direction, that the gelatinizing agent is transported by the guide means as well as the horizontal component of the vector showing the movement, i.e. the direction, that the seeds are transported by the seed transporting means.

BRIEF DESCRIPTION OF THE DRAWINGS

The present invention will be more apparent from the ensuring description with reference to the accompanying drawing wherein:

FIG. 9 is an enlarged front view of a gel processing portion shown in FIG. 2;

FIG. 10 is an enlarged plan view of the gel processing portion shown in FIG. 2;

FIG. 14 is an enlarged view of the gel curing section illustrated in FIG. 1;

FIG. 16 is a cross-sectional view taken along the line B—B in FIG. 14;

DETAILED DESCRIPTION OF PREFERRED EMBODIMENTS

Now, a gel-coated seed processing method according to the present invention together with a gel-coated seed processing apparatus according to a preferred embodiment will be explained with reference to drawings.

Figure 1:
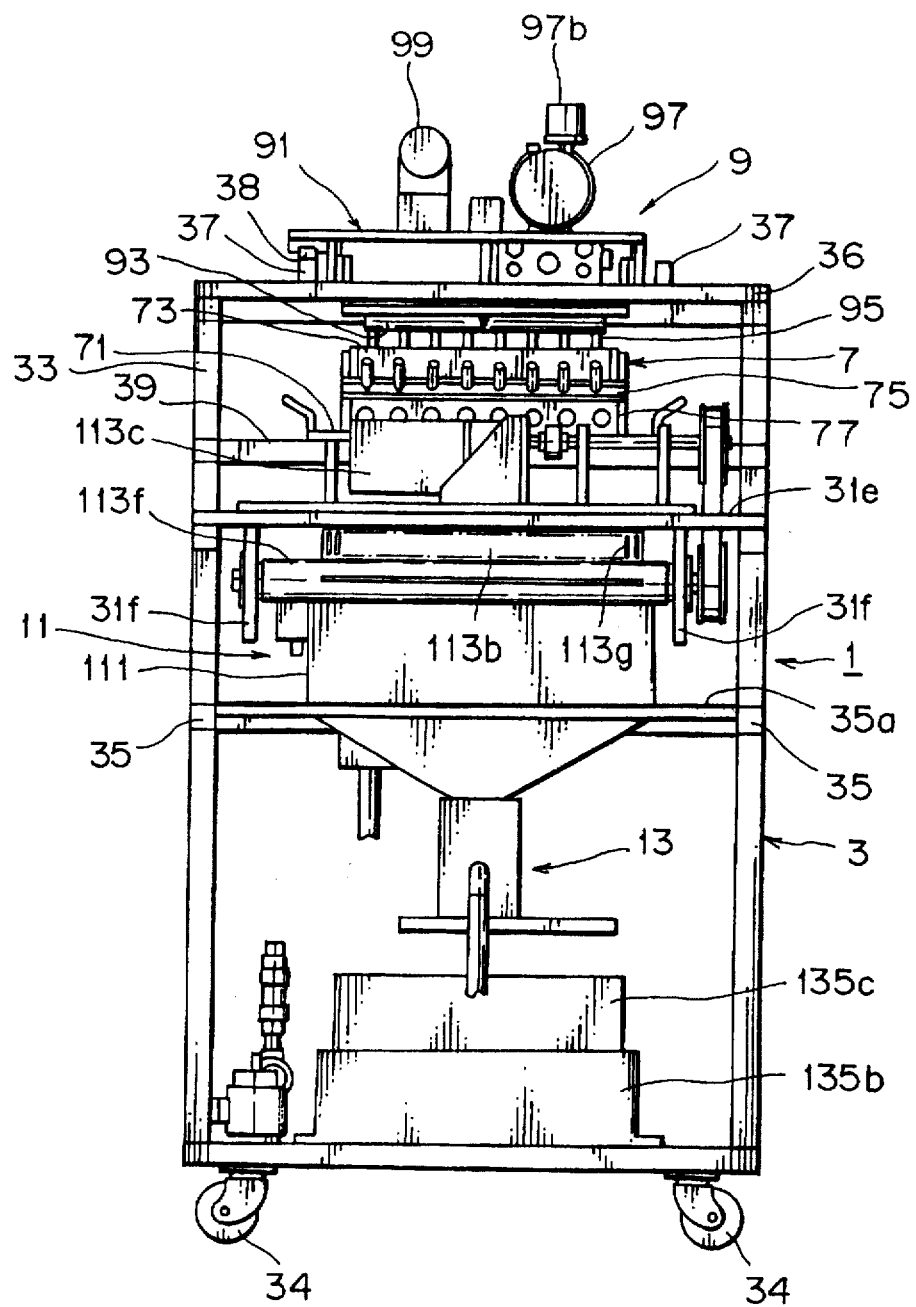
FIG. 1 is a schematic front view showing a gel-coated seed processing apparatus according to one embodiment of the present invention.
Figure 2:
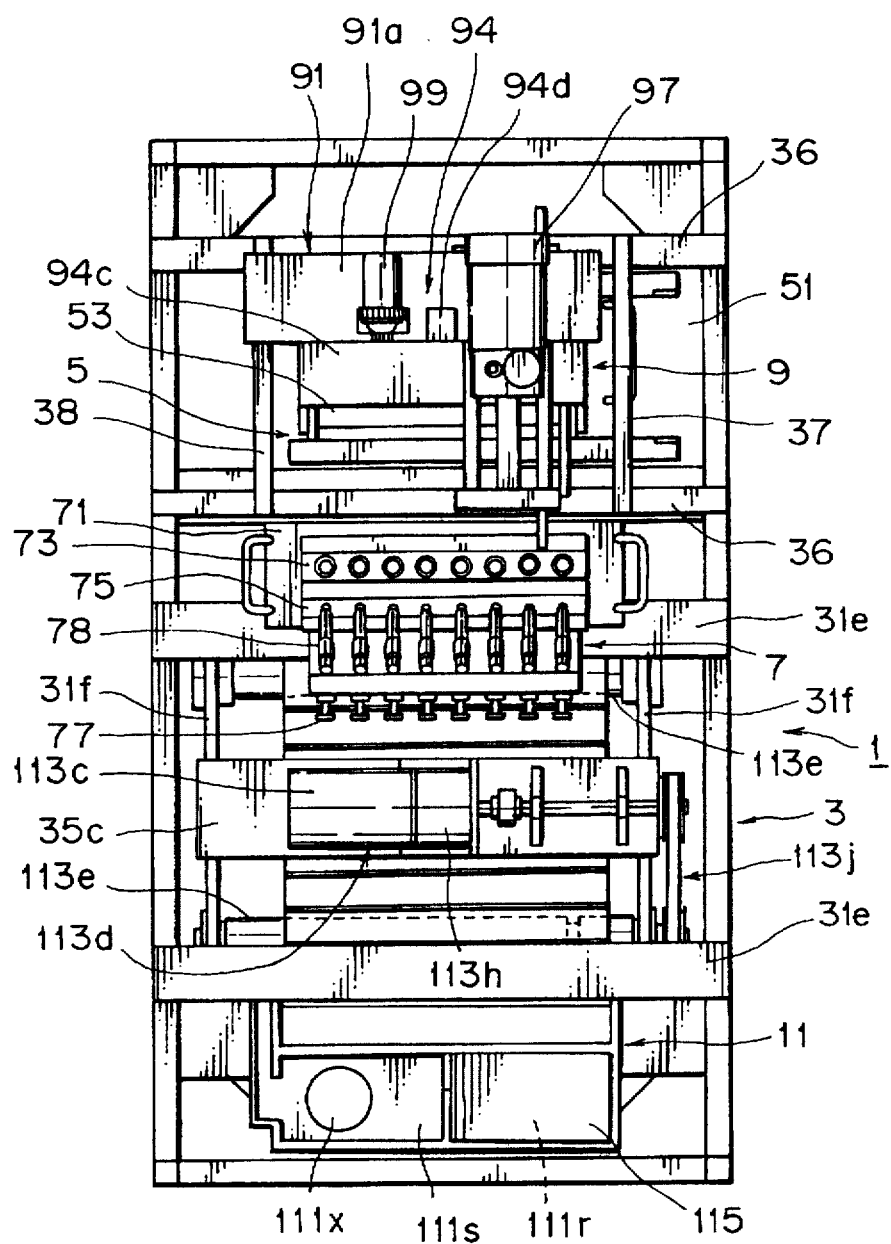
FIG. 2 is a plan view of the gel-coated seed processing apparatus shown in FIG. 2.

FIG. 1 is a schematic front view of the a gel-coated seed processing apparatus according to an embodiment of the present invention; FIG. 2 a plan view of the apparatus; and FIG. 3 a side view of the apparatus. The gel-coated seed processing apparatus according to this embodiment shown in the figures as reference symbol 1 comprises a stand 3, a seed feeding section 5, a gel processing section 7, a seed transporting section 9, a gel curing section 11, a gel washing section 13 and the like.

Figure 3:
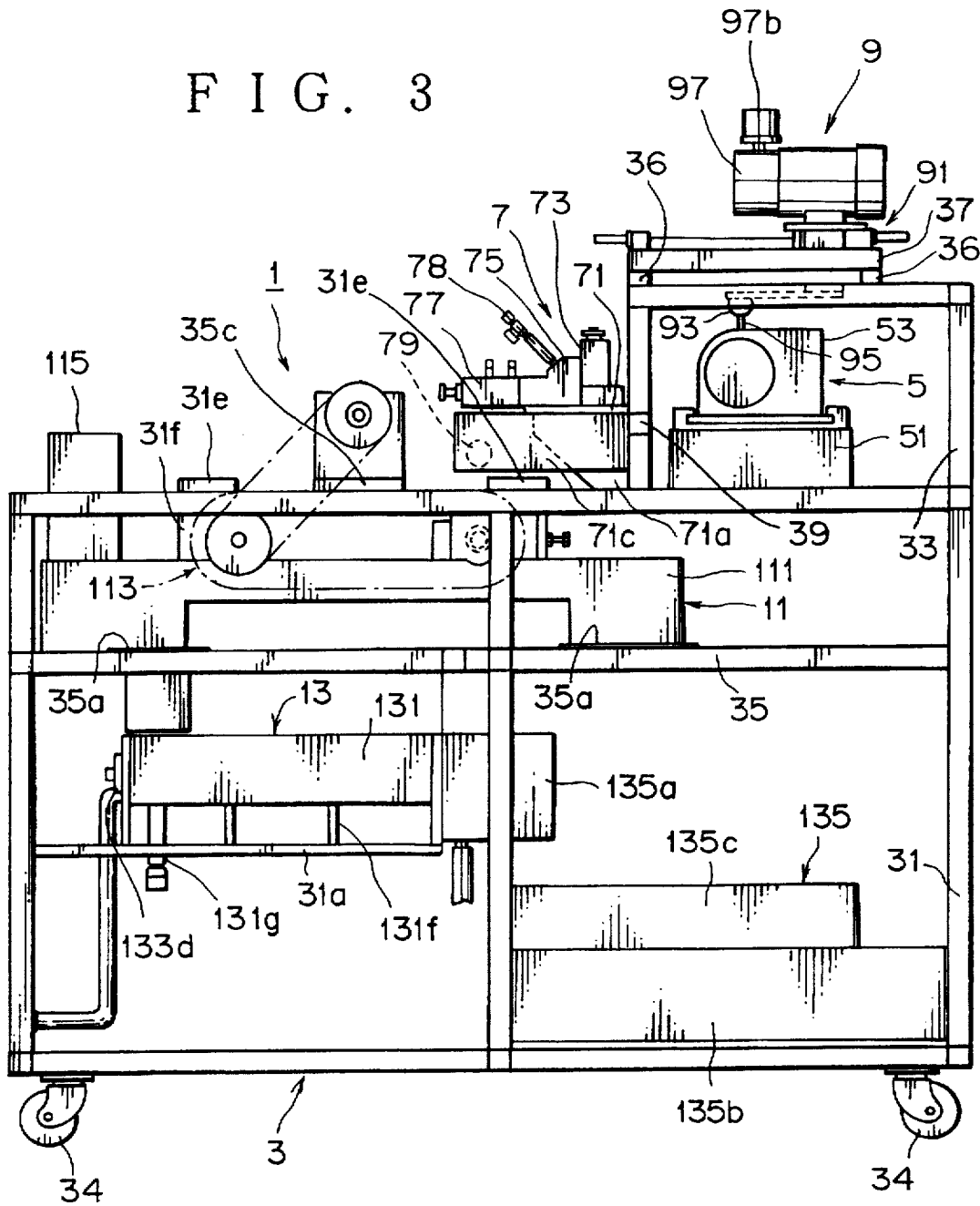
FIG. 3 is a side view of the gel-coated seed processing apparatus shown in FIG. 1.

The stand 3 is formed as a frame with open sides, as illustrated in FIG. 3, and is provided with a main frame 31 with a longitudinally extending substantial rectangle when observed from upside, and an auxiliary frame 23 standing on the main frame 31 at a slightly rearward portion thereof, and the main frame 31 is movably supported by casters 34 in four corners of the bottom surface, and at slightly upper end portion with respect to the vertically central portion of the main frame 31 is mounted a longitudinally and horizontally extending transverse reinforcing frame 35.

Figure 4:
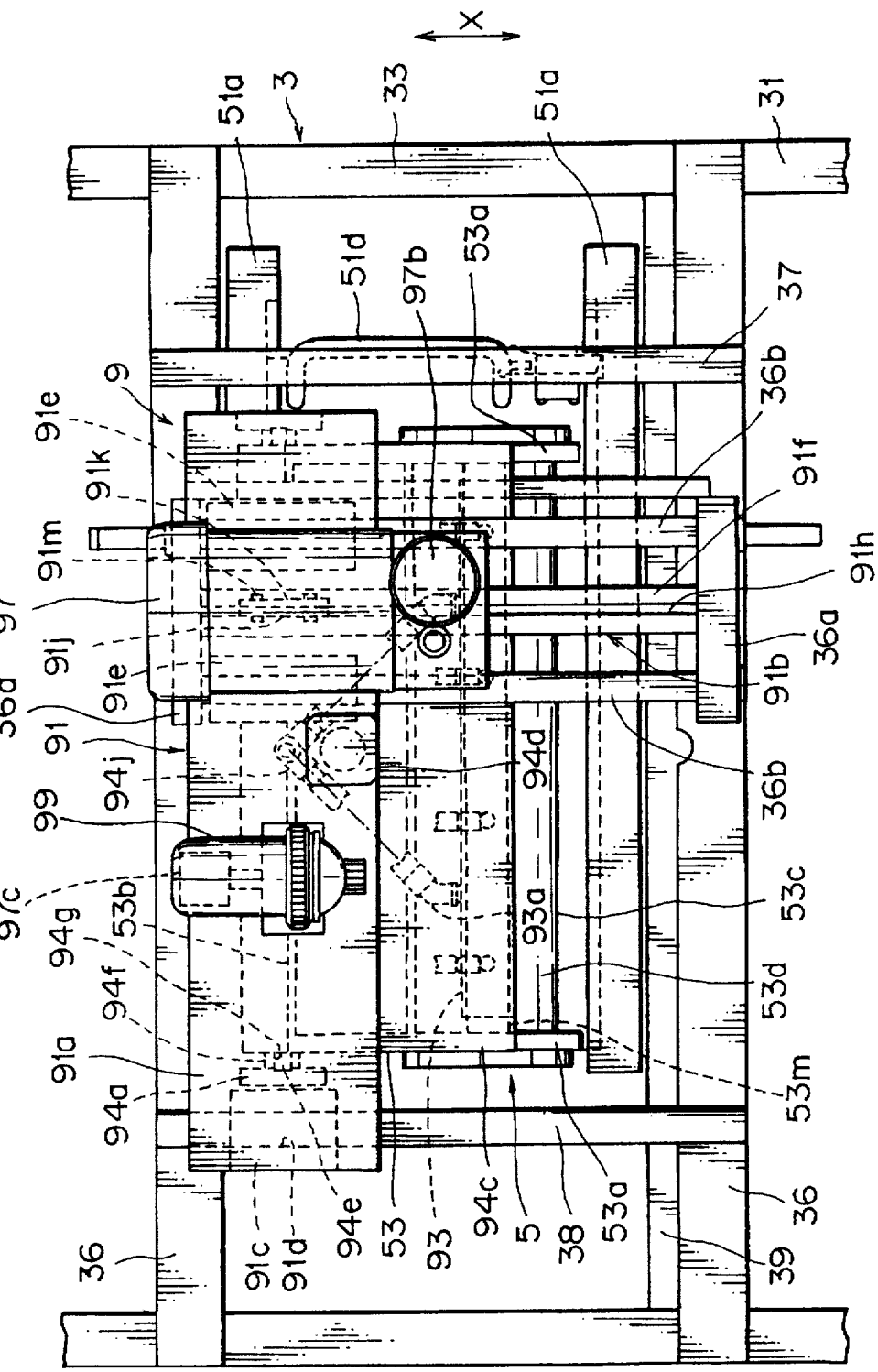
FIG. 4 is an enlarged plan view of an auxiliary frame and a seed transporting section illustrated in FIG. 2.

Further, as illustrated in FIG. 4, an enlarged plan view of the auxiliary frame and the seed transporting section, at a front end portion of the auxiliary frame 33 and a portion slightly forward portion with respect to the rear end of the auxiliary frame 33 and between both right and left frame portions are mounted horizontally extending main upper frames 36 respectively.

Further, on the both main upper frames 36 and between portions with an interval in between in the transverse direction of the auxiliary frame 33 are mounted horizontally extending two auxiliary frames 37 for reinforcing the main upper frames 36, and on the left auxiliary frame 37 is supported a guide rail 38 (see FIG. 5) which extends in the longitudinal direction of the stand 3 in parallel with the auxiliary frames 37.

Further, as illustrated in FIG. 1, between portions of both right and left front portions of the auxiliary frame 33 and at a portion slightly lower than a vertically central portion thereof is mounted a horizontally extending front transverse frame 39.

Further, as illustrated in FIG. 4, a supporting plate 36a stands on the upper surface of each of main upper flames 36 at a portion slightly close to the left auxiliary frame 37 with respect to the central portion of the main upper flames 36 in a transverse direction thereof, and at portions right and left of the supporting plate 36a with intervals between them are horizontally and parallelly mounted guide shafts 36b.

The seed feeding section 5 is provided to feed seeds, which are processed to produce gel-coated seeds, as illustrated in FIG. 3, and the seed feeding section 5 is mounted on the main frame 31 and inside of the auxiliary frame 33.

The seed feeding section 5 is provided with a base 51 fixed to the main frame 31 and a seed tank 53 securely mounted on the base 51.

Figure 5:
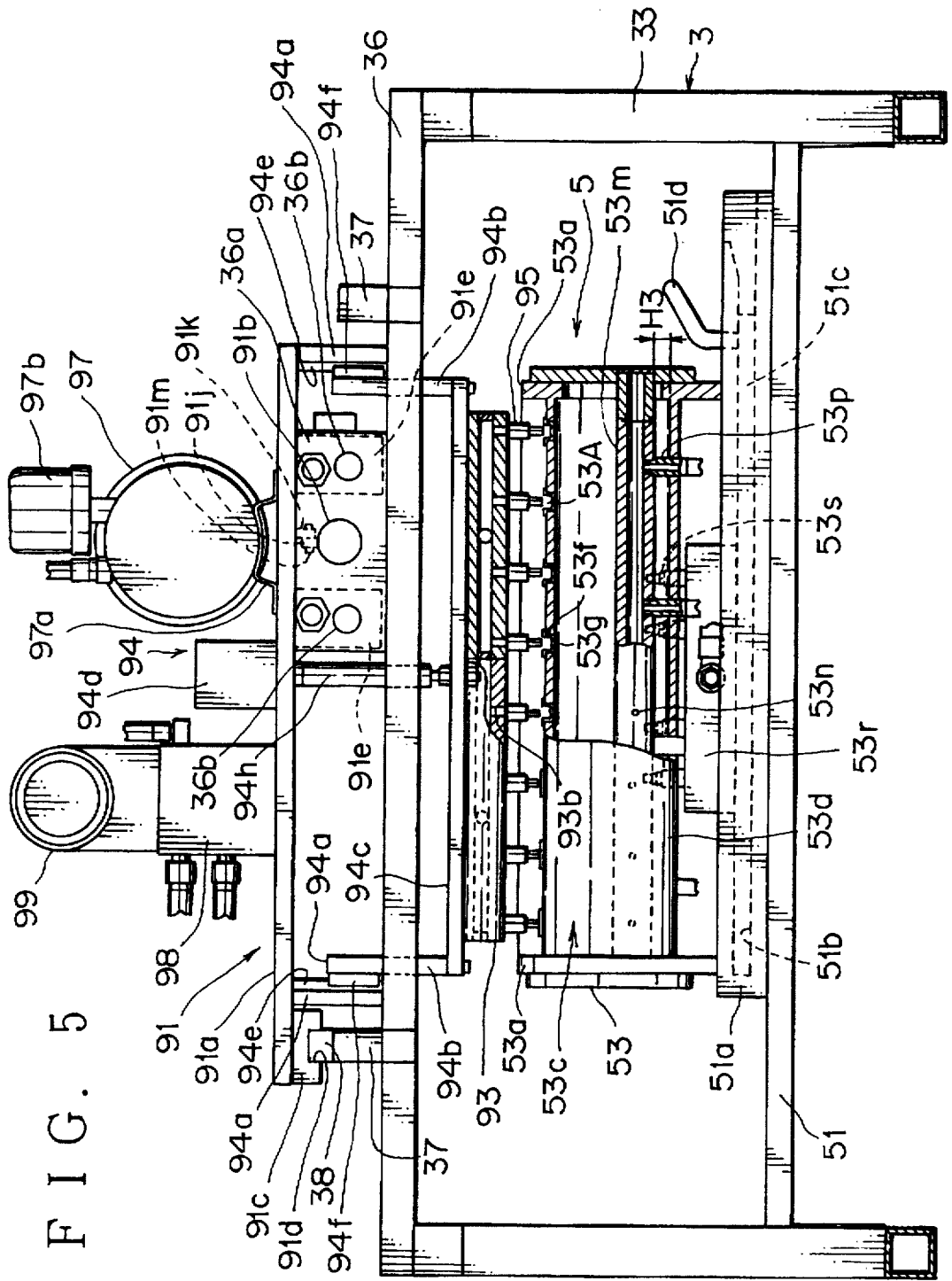
FIG. 5 is a partially fragmented enlarged front view of a seed feeding section and the seed transporting section shown in FIG. 2.
Figure 6:
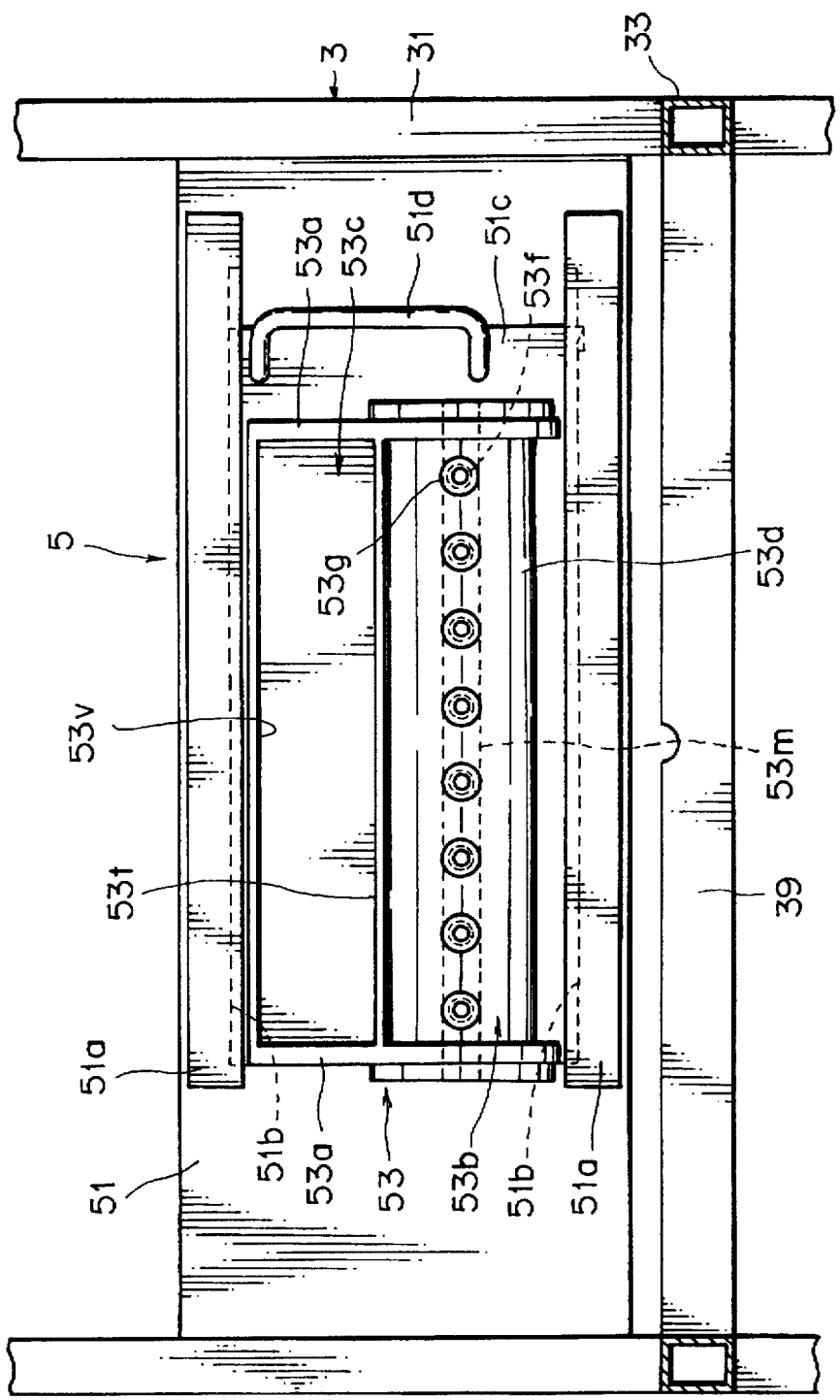
FIG. 6 is an enlarged plan view of the seed feeding section shown in FIG. 2.
Figures 7, 8:
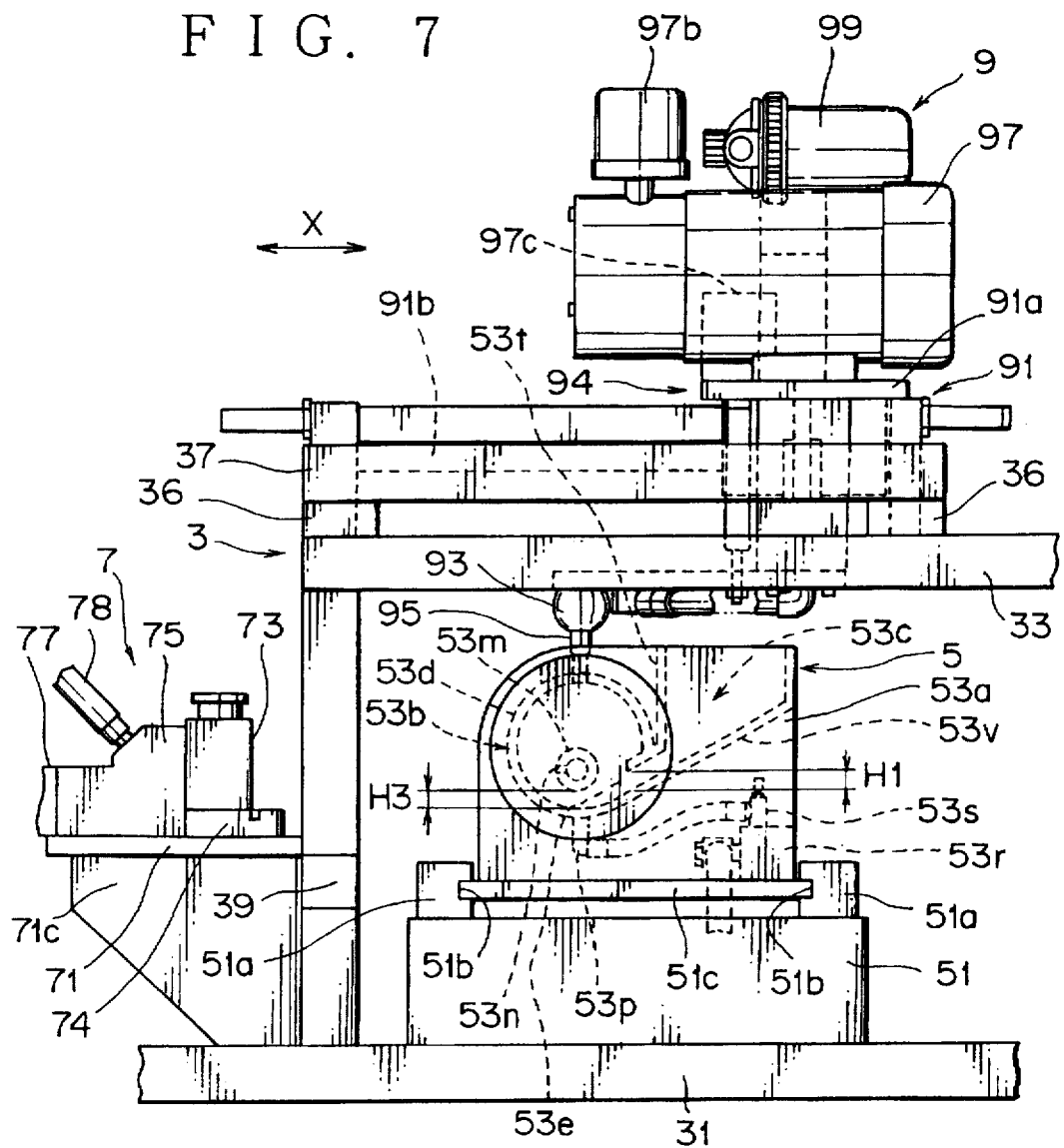
FIG. 7 is an enlarged side view of the seed feeding section and the seed transporting section shown in FIG. 2.
FIG. 8 is an enlarged view of an adapter shown in FIG. 5.

FIGS. 5, 6 and 7 are an enlarged front view of the seed feeding section and the seed transporting section, an enlarged plan view of the seed feeding section, and an enlarged side view of the seed feeding section and the seed transporting section, respectively. The base 51, as illustrated in FIG. 6, has a shape of substantial rectangle when observed from upside and the length bridging the right and left frames of the main frame 31. The base 51 extends in the transverse direction of the main frame 31, and guide rails 51a are parallelly mounted at both front and rear portions on the base 51.

On the inner surfaces, opposing each other, of the guide rails 51a, as illustrated in FIG. 7, guide channels 51b with U-shaped cross sections are formed at both front and rear ends of the base 51, and between the guide rails 51a is supported a slide plate 51c, which engages with the guide channels 51b at both right and left ends thereof, so as to be drawable toward right and outside of the main frame 31.

Reference symbol 51d in FIG. 6 shows a handle for sliding the slide plate 51c.

The seed tank 53 is mounted on the slide plate 51c, and is made of acrylic resin plate or the like, and as illustrated in FIG. 5, the seed tank 53 is provided with a pair of side walls 53a, which stand on the slide plates 51c with interval between them in the transverse direction of the gel-coated seed processing apparatus 1, and a tank main body 53b and a hopper portion 53c, which are formed between the both side walls 53a as illustrated in FIG. 6.

As illustrated in FIG. 6, the tank main body 53b has a shape of substantial cylinder extending in right and left directions, in which a substantially cylindrical peripheral wall 53d is coated with the both side walls 53a at both ends thereof.

On the peripheral wall 53d of the tank main body 53b on the bottom side thereof is formed a horizontally extending slit 53e with the height of H1 across the both side walls 53a as illustrated in FIG. 7.

Further, at the upper end of the peripheral wall 53d, as illustrated in FIG. 5 as a partially fragmented view, eight substantially round through holes when observed from upside are formed at regular intervals in right and left directions, and to each through hole 53f is detachably mounted a cap-shaped adapter 53g with a through hole 53A at the center thereof.

The inner peripheral wall of the through hole 53A of the adapter 53g is, as illustrated in FIG. 8, provided with a portion 53h with large diameter on the outer peripheral surface side of the peripheral wall 53d of the tank main body 53b and another portion 53j with small diameter on the inner peripheral surface side, and a tiered portion 53k is formed on the boundary of the portion 53h with large diameter and the portion 53j with small diameter.

Further, in the tank main body 53b, as illustrated in FIG. 7, is mounted a cylindrical air chamber 53m across the both side walls 53a, with sufficiently small diameter in comparison with the tank main body 53b, in such a manner as to be situated above the inner peripheral wall of the bottom of the tank main body 53b with a small clearance H3, almost the same as the height H1, between the inner peripheral wall of the bottom of the tank main body 53b and the air chamber 53m.

The air chamber 53m is divided into two parts in substantially central portion of the both side walls 53a, and on the peripheral surface of the divided right and left air chambers on the rear side thereof, and opposite to the slit 53e, as illustrated in FIGS. 5 and 7, are formed a plurality of blowing spouts 53n right and left at regular intervals.

Further, to the bottom surface of each divided air chamber 53m, as illustrated in FIG. 5, are connected two ends of the joints 53p respectively, and the joints 53p penetrate the bottom portion of the tank main body 53b and extend out of the tank main body 53b, and each of the other ends of the joints 53p is, as illustrated in FIG. 7, through a high pressure hose not shown, connected to each of four joints 53s of a manifold 53r which is fixed on the base 51 adjacent to the rear portion of the tank main body 53b.

To the manifold 53r is fed compressed air from an air compressor (not shown), which is situated out of the gel-coated seed processing apparatus 1, through a reducer, and the compressed air is supplied to the divided air chamber 53m through the joints 53s, 53p and the high pressure hose.

The hopper portion 53c consists of a front plate 53t, which substantially vertically stands from the peripheral wall 53d of the tank main body 53b above the slit 53e, and a rear plate 53v, which extends from the lower portion of the slit 53e and is gradually inclined as being apart from the tank main body 53b, and of which tip portion is substantially vertically stands. The rear plate 53v is integrally formed with the peripheral wall 53d so as to extend upward and rearward from a portion adjacent to the bottom portion of the tank main body 53b in the direction of the tangential line of the peripheral wall 53d.

The gel processing section 7 is provided to produce the coated seeds by coating the seeds with gelatinizing agent, and as illustrated in FIG. 3, the gel processing section 7 is mounted on the main frame 31 in front of the auxiliary frame 33. The gel processing section 7 comprises a base plate 71 bridging right and left ends of the main frame 31, a nozzle block 73 mounted on the base plate 71, a gel accommodating block 75 secured on the base plate 71 at a portion adjacent to the front portion of the nozzle block 73, eight pressure air cylinders 77 and eight air extracting valves 78 connected to the gel accommodating block 75, and a manifold 79 for supplying the gelatinizing agent to the gel accommodating block 75.

FIGS. 9, 10 and 11 are an enlarged front view, an enlarged plan view and an enlarged side view of the gel processing section respectively, and the base plate 71 has a shape of horizontally extending substantial rectangle as illustrated in FIG. 10, and the rear end of the base plate 71 is, as illustrated in FIG. 3, engaged with the front transverse frame 39 of the auxiliary frame 33, and under the conditions described above, as illustrated in FIG. 11, the base plate 71 is horizontally supported by two reinforcing plates 71a at right and left which project on the auxiliary frame 33 at a front portion thereof lower than the front transverse frame 39.

The nozzle block 73 is mounted on the base frame 74 like a gate between the right and left ends of the base plate 71, and as illustrated in FIG. 10, the nozzle block 73 has a shape of substantial rectangle when observed from upside and extends right and left with a longitudinal length shorter than the base plate 71.

Figure 12:
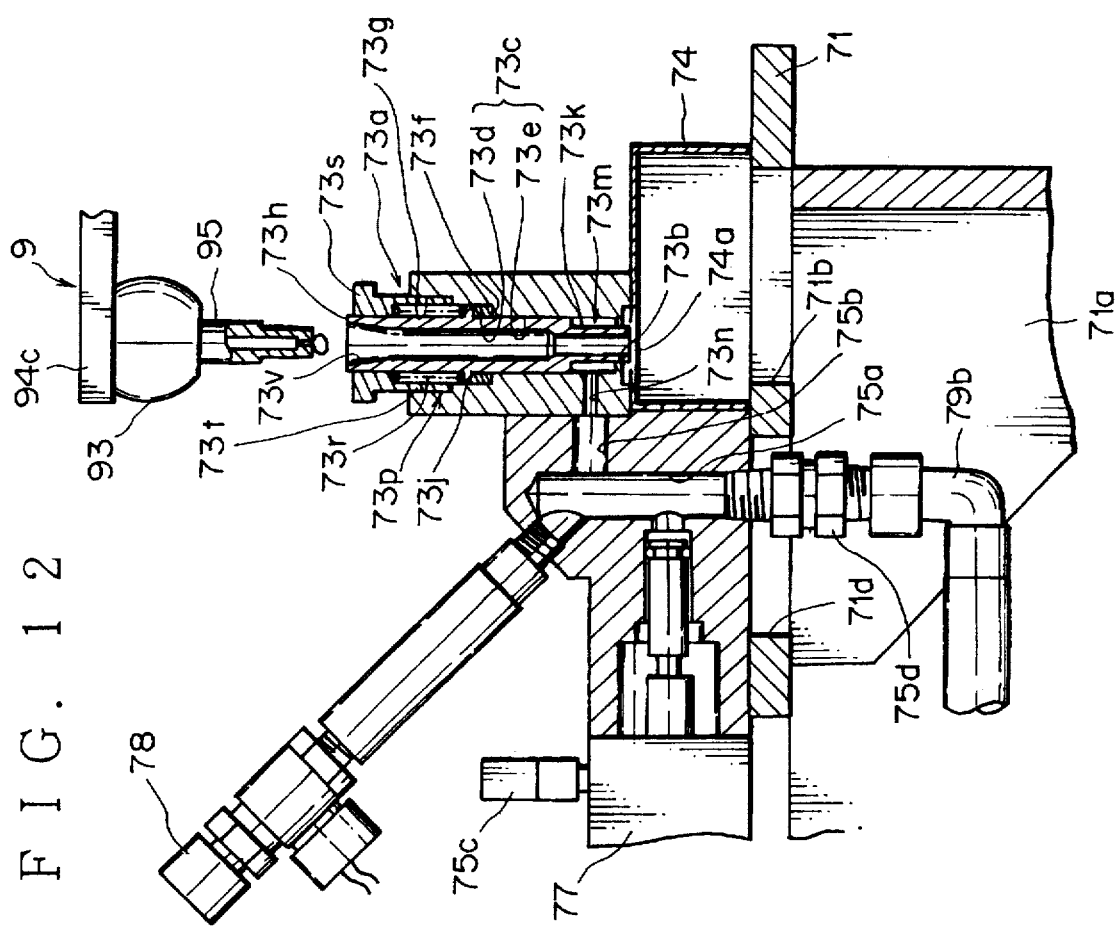
FIG. 12 is an enlarged cross-sectional view of a nozzle block shown in FIG. 11.

On the upper surface of the nozzle block 73 are formed eight seed feeding spouts 73a at regular intervals right and left, and on the lower surface of the nozzle block 73 corresponding to each of the seed feeding spouts 73a are mounted valves 73b with smaller inner diameters in comparison with the seed feeding spouts 73a as illustrated in FIG. 12 as an enlarged cross-sectional view.

In the nozzle block 73 are formed eight passages 73c vertically penetrating therethrough through the seed feeding spouts 73a and the valves 73b corresponding to the seed feeding spouts 73a.

The passage 73c is provided with a portion 73d with large diameter, which is in communication with the seed feeding spouts 73a and is formed to have almost the same diameter as the seed feeding spouts 73a, and a portion 73e with small diameter, which is in communication with the valves 73b and has slightly larger diameter than that of the valves 73b and smaller diameter than the large diameter portion 73d. At a portion on the inner wall of the passage 73c slightly toward the seed feeding spouts 73a with respect to the vertically central portion thereof is formed a tiered portion 73f as a border of the large diameter portion 73d and the small diameter portion 73e. The large diameter portion 73d is provided with a female screw 73g.

A cylindrical plunger 73h is vertically movably accommodated in each of the passages 73c.

The cylindrical plunger 73h has the outer diameter corresponding to the inner diameter of the small diameter portion 73e, and on the outer peripheral surface of the cylindrical plunger 73h is formed a flange 73j with the outer diameter corresponding to the inner diameter of the large diameter portion 73d of the passage 73c. At a portion apart from the flange 73j and on the one side of the cylindrical plunger 73h is formed a portion 73k with a smaller diameter than that of the other end thereof.

The cylindrical plunger 73h is inserted into the passage 73c with the seed feeding spouts 73a directing downward through the seed feeding spouts 73a, and the upper end (other end) of the cylindrical plunger 73h upwardly projects from the seed feeding spouts 73a with the flange 73j engaging the tiered portion 73f of the passage 73c, and the lower end (one end) of the cylindrical plunger 73h, that is, the lower end of the small diameter portion 73k is located so as to substantially be flush with the lower surface of the nozzle block 73. The lower end peripheral surface of the cylindrical plunger 73h closely contacts with the inner peripheral surface of the valves 73b without clearance between them to close the valve 73b.

Then, under the condition described above, between the small diameter portion 73e of the passage 73c and the small diameter portion 73k of the cylindrical plunger 73h is provided a ring-shaped space 73m, and the spaces 73m are in communication with each other through the front side situated on the gel accommodating block 75 side of the nozzle block 73, and the through hole 73n.

Under the above-mentioned conditions, between the peripheral wall of the cylindrical plunger 73h on the upper end side with respect to the flange 73j and the large diameter portion 73d of the passage 73c is situated a ring-shaped space 73p, and in the large diameter portion 73d is accommodated a coil spring 73r, and a male screw 73t of a cap 73s is engaged with the female screw 73g of the large diameter portion 73d. The coil spring 73r is pressed toward the flange 73j by the end surface of the male screw 73t under the condition that the cap 73s is screwed in the passage 73c.

As a result, the cylindrical plunger 73h is urged by the resilience of the coil spring 73r in such a manner that the lower end of the small diameter portion 73k closes the valves 73b through the flange 73j.

The reference numeral 73v in FIG. 12 shows a passage penetrating the cylindrical plunger 73h, and the passage 73v has almost the same inner diameter as the large diameter portion 53h with the largest inner diameter among a plurality kinds of adapters 53g.

Further, at portions of the base frame 74 and the base plate 71 adjacent to the valves 73b are formed through holes 74a, 71b allowing gelatinizing agent particles, which drop from the valve 73b, to pass to the lower portion of the base plate 71.

A plurality of cylindrical plungers 73h with different outer diameter of the small diameter portion 73k thereof are prepared, and like the adapter 53g, the cylindrical plunger 73h with the ring-shaped small diameter portion 73k of the most suitable dimension is selectively accommodated in the passage 73c in such a manner that suitable amount of gelatinizing agent to coat the seed drops in accordance with the dimension and shape of the seed which is transported from the seed feeding section 5 to the gel processing section 7.

The gel accommodating block 75, as shown in FIG. 10, has a shape of substantial rectangle which extends right and left in the figure, and the length of the gel accommodating block 75 corresponds to the nozzle block 73.

In the gel accommodating block 75, as illustrated in FIG. 12, passages 75a for gel with downward openings are formed at regular intervals right and left of the gel accommodating block 75 in accordance with each of the passages 73c.

A portion of the passage 75a toward the upper end thereof and the rear surface of the gel accommodating block 75 neighboring the through hole 73n for the nozzle block 73 are in communication with each other through the through hole 75b, and the passages 75a and the spaces 73m of the passage 73c for the nozzle block 73 communicate with each other through the through hole 75b and the through hole 73n of the nozzle block 73.

The pressure air cylinder 77 is horizontally connected to the front surface opposite to each of the through holes 75b at the gel accommodating block 75, and the inside of the pressure air cylinder 77 is in communication with the passage 75a at a lower portion thereof slightly lower than the through hole 75b.

The reference symbol 75c in FIG. 12 shows a speed controller for adjusting the motion, stretching and retracting, of the pressure air cylinder 77.

At the lower end of the passage 75a is mounted a check valve 75d for preventing reverse flow directing outside from the passage 75a.

Each of the air extracting valves 78 is connected to an inclined surface of the gel accommodating block 75 at the upper end of the front surface, to which the pressure air cylinder 77 is connected, so as to be inclined substantially 45° forward, and inside of each of the air extracting valves 78 is in communication with the upper end portion of corresponding passage 75a.

Figure 11:
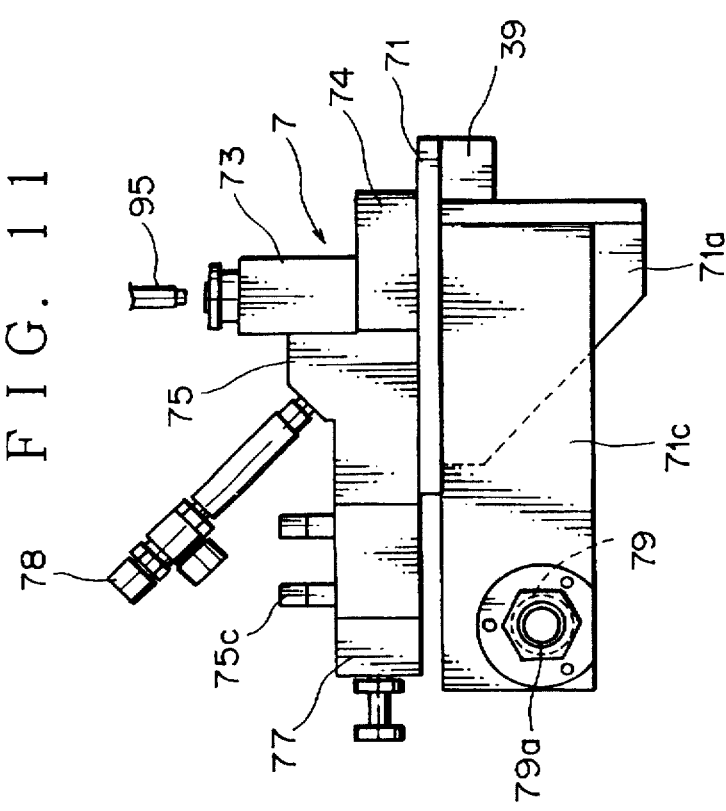
FIG. 11 is an enlarged side view of the gel processing portion shown in FIG. 2.

The manifold 79, as illustrated in FIG. 11, is mounted at the lower portion of the pressure air cylinder 77 with a clearance of the base plate 71 in between, and has a shape of substantial cylinder. As illustrated in FIG. 9, the both ends of the manifold 79 are closed and supported by a pair of brackets 71c, which are mounted to the lower surface of the both right and left ends of the base plate 71, each of them extending forward from the base plate 71.

To an end of the manifold 79 is connected a detachable joint 79a (hereinafter referred to as "coupler") through the bracket 71c, and the detachable joint 79a is connected to a gelatinizing agent tank (not shown) through high pressure hoses and a pump not shown.

To the outer peripheral surface on rear side of the manifold 79 are connected ends of eight joints 79b at regular intervals in the transverse direction of the gel-coated seed processing apparatus 1, and the other ends of the joints 79b are, as illustrated in FIG. 12, are connected to the lower ends of the corresponding passage 75a of the gel accommodating block 75 respectively.

The seed transporting section 9 is mounted to transport the seeds from the seed feeding section 5 to the gel processing section 7, and as illustrated in FIG. 3, is provided with a movable stage 91 which is movably supported in forward and rearward directions of the gel-coated seed processing apparatus 1 on the auxiliary frame 33, a manifold 93 which is vertically movably supported by the movable stage 91, eight suction tips 95 supported by the manifold 93, and the vacuum pump 97 securely mounted on the movable stage 91.

The movable stage 91 is provided with, as illustrated in FIG. 7, a base plate 91a, and a rodless magnetic cylinder 91b for moving the base plate 91a.

The base plate 91a, as shown in FIG. 4, has a shape of substantial rectangle when observed from above with a width bridging right and left frames of the auxiliary frame 33 and extends right and left. As illustrated in FIG. 7, the base plate 91a is horizontally mounted above the auxiliary frame 33, and as illustrated in FIG. 5, a slider 91c is mounted on the lower surface of the base plate 91a at slightly near the left frame of the auxiliary frame 33.

As illustrated in FIG. 5, on the lower surface of the slider 91c is formed a guide channel 91d with downward opening, and the guide channel 91d engages the guide rail 38 on the left auxiliary frame 37 from upside.

Further as illustrated in FIG. 4, blocks 91e with collars are mounted at lower portions of the base plate 91a neighboring each of the guide shafts 36b with the base plate 91a positioned between the main upper flames 36, and respective guide shafts 36b penetrate respective collars of the blocks 91e in forward and rearward directions of the gel-coated seed processing apparatus 1.

The rodless magnetic cylinder 91b is, as illustrated in FIG. 4, mounted on the supporting plate 36a of each of the main upper flames 36 between the supporting plates 36a in about intermediate portion of the two guide shafts 36b, and a cylinder barrel 91f of the rodless magnetic cylinder 91b is disposed below the base plate 91a and between the blocks 91e so as not to be interfered with the base plate 91a and the both blocks 91e.

At the upper portion of the cylinder barrel 91f is formed a slit 91h along almost overall length of the cylinder barrel 91f, and in the cylinder barrel 91f is disposed a piston yolk (not shown) which slides between the both ends of the cylinder barrel 91f by the action of the magnet.

A piston mount 91j which slides together with the piston yolk projects out of the cylinder barrel 91f from the slit 91h, and to the piston mount 91j is fixed a bracket 91k extending downward from a lower portion of the base plate 91a between the both blocks 91e by screws 91m.

The manifold 93, as indicated in FIG. 5, has a width slightly smaller than that of the seed tank 53, and as illustrated in FIG. 7, the manifold 93 has a shape of cylinder with substantially round side surface and with closed both ends. The manifold 93 is supported by the base plate 91a through the elevating mechanism 94.

The elevating mechanism 94, as illustrated in FIG. 5, is provided with side plate 94a, each of them extending downward from the bottom surface of the base plate 91a on the inner side of the slider 91c in right and left directions thereof, a pair of vertically movable frames 94b, each of them disposed on the inner side of the side plate 94a, a sustaining plate 94c which is supported by the vertically movable frames 94b at both right and left ends thereof and is positioned below the base plate 91a, and an air cylinder 94d vertically moving the sustaining plate 94c with respect to the base plate 91a.

On the inner surface of each of the side plate 94a is formed a vertically extending guide rail 94e, and on the outer surface of each of the vertically movable frame 94b is mounted a slider 94f. As illustrated in FIG. 4, the guide channel 94g with outward opening formed on the outer surface of each of the slider 94f engages each of the guide rails 94e on corresponding side wall.

The sustaining plate 94c has a length in forward and rearward directions of the gel-coated seed processing apparatus 1 longer than that of the base plate 91a in such a manner that the front end of the sustaining plate 94c is positioned in front of the base plate 91a with the rear end thereof positioned at substantially central portion of the base plate 91a in forward and rearward directions thereof.

The air cylinder 94d is mounted on the base plate 91a toward the front end thereof and slightly left from the block 91e, and the cylinder rod of the air cylinder 94d, as illustrated in FIG. 5, passes through the base plate 91a, and through a joint rod 94h, as illustrated in FIG. 4, the air cylinder 94d is mounted on the upper surface of the sustaining plate 94c at rearward portion thereof.

The manifold 93 is mounted to the front bottom surface of the sustaining plate 94c, and each of joints 93a is mounted to a rear end with a clearance in the transverse direction of the gel-coated seed processing apparatus 1 in between at a rear end of the peripheral wall of the manifold 93.

At the lower end of the peripheral wall of the manifold 93 and at eight portions on the peripheral wall at regular intervals in the transverse direction of the gel-coated seed processing apparatus 1 corresponding to the through holes 53f of the tank main body 53b are formed through hole 93b respectively as illustrated in FIG. 5.

The two joints 93a are, as illustrated in FIG. 4, connected to a two-way joint 94j respectively which is mounted to the bottom surface of the sustaining plate 94c positioned rearward from the air cylinder 94d through high pressure hoses not shown.

The suction tips 95 are, as illustrated in FIG. 5, detachably mounted to each of the through holes 93b of the manifold 93 respectively, and the suction tip 95 is substantially cylindrical. At the center of the suction tip 95 is formed a suction passage (not shown) which is in communication with the inside of the manifold 93.

A plurality of suctions tips 95 with different outer diameters and suction passages are prepared, and like the adapter 53g of the tank main body 53b, the suction tip 95 with the most suitable outer diameter and inner diameter of the suction passage for sucking the seeds is selectively mounted to each of the through hole 93b in accordance with the dimension and shape of the seed which is transported from the seed feeding section 5 to the gel processing section 7.

The rodless magnetic cylinder 91b is constructed so as to move the manifold 93, through the slide of the piston mount 91j in forward and rearward directions, in forward and rearward directions between the rear position where the tip portion of each of the suction tips 95 is positioned above corresponding adapter of the tank main body 53b under the air cylinder 94d of the elevating mechanism 94 shrinks, and the front position where the tip portion of each of the suction tip 95 is positioned above corresponding seed feeding spout 73a of the nozzle block 73.

The air cylinder 94d of the elevating mechanism 94 is constructed so as to allow the tip portion of each of the suction tips 95, as indicated by phantom lines in FIG. 8, to position at a height immediately before contacting the tiered portion 53k of the corresponding adapter 53g through stretching of the piston rod at the rear position of the rodless magnetic cylinder 91b, and to allow the tip portion of each of the tips 95 to position through stretching of the piston rod at the front position of the rodless magnetic cylinder 91b at a height that the tip portion is inserted into the passage 73v of the cylindrical plunger 73h in the passage 73c from the seed feeding spouts 73a.

At the stretching of the air cylinder 94d at the rear position of the rodless magnetic cylinder 91b, slight clearance is generated between the adapter 53g and the suction tip 95, so that inside of the tank main body 53b communicates with the outside of the tank main body 53b through this clearance.

The vacuum pump 97 is, as illustrated in FIG. 5, mounted on the top of the base plate 91a opposite to the both blocks 91e through seat 97a, and on the vacuum pump 97 is mounted a silencer 97b. Further, on the base plate 91a left of the vacuum pump 97 is mounted an air filter 99 through a manifold 98.

The vacuum pump 97 is connected to the air filter 99 with high pressure hoses not shown, and the air filter 99 is, as illustrated in FIG. 4, connected to a pressure sensor 97c disposed on the base plate 91a at rear portion of the gel-coated seed processing apparatus 1 from the manifold 98 through the high pressure hoses not shown and the manifold 98.

The manifold 98, separately from the pressure sensor 97c, is connected to the two joints 93a of the manifold 93 with high pressure hoses not shown and the two-way joint 94j.

The gel curing section 11 is used to harden gelatinizing agent particles of coated seeds, which are processed by the gel processing section 7, through reaction with the curing agent to produce gel-coated seeds, and as shown in FIG. 3, the gel curing section 11 is provided with a curing vessel 111, a gel guide mechanism 113 and a curing agent feeding mechanism 115.

Figure 13:
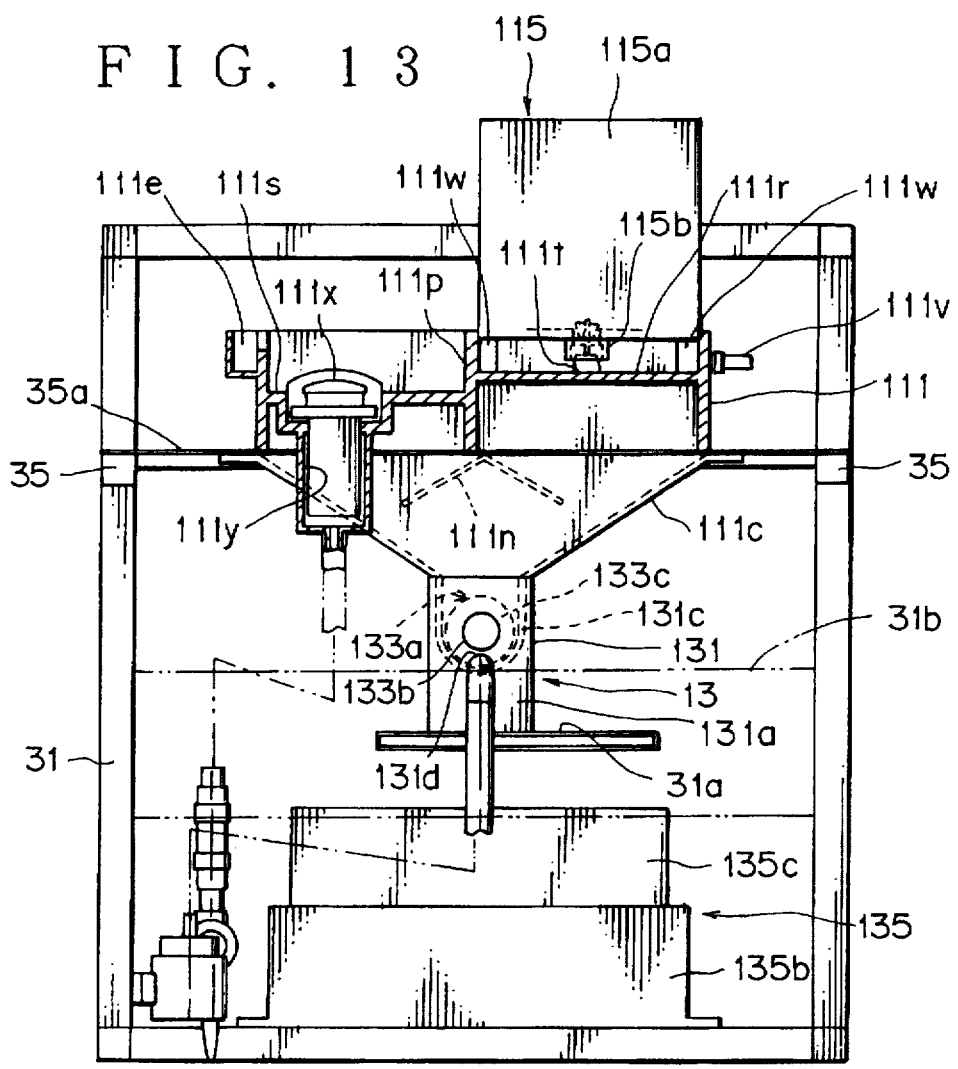
FIG. 13 is a partially fragmented enlarged front view of a gel curing section and a gel washing section shown in FIG. 1.
Figure 15:
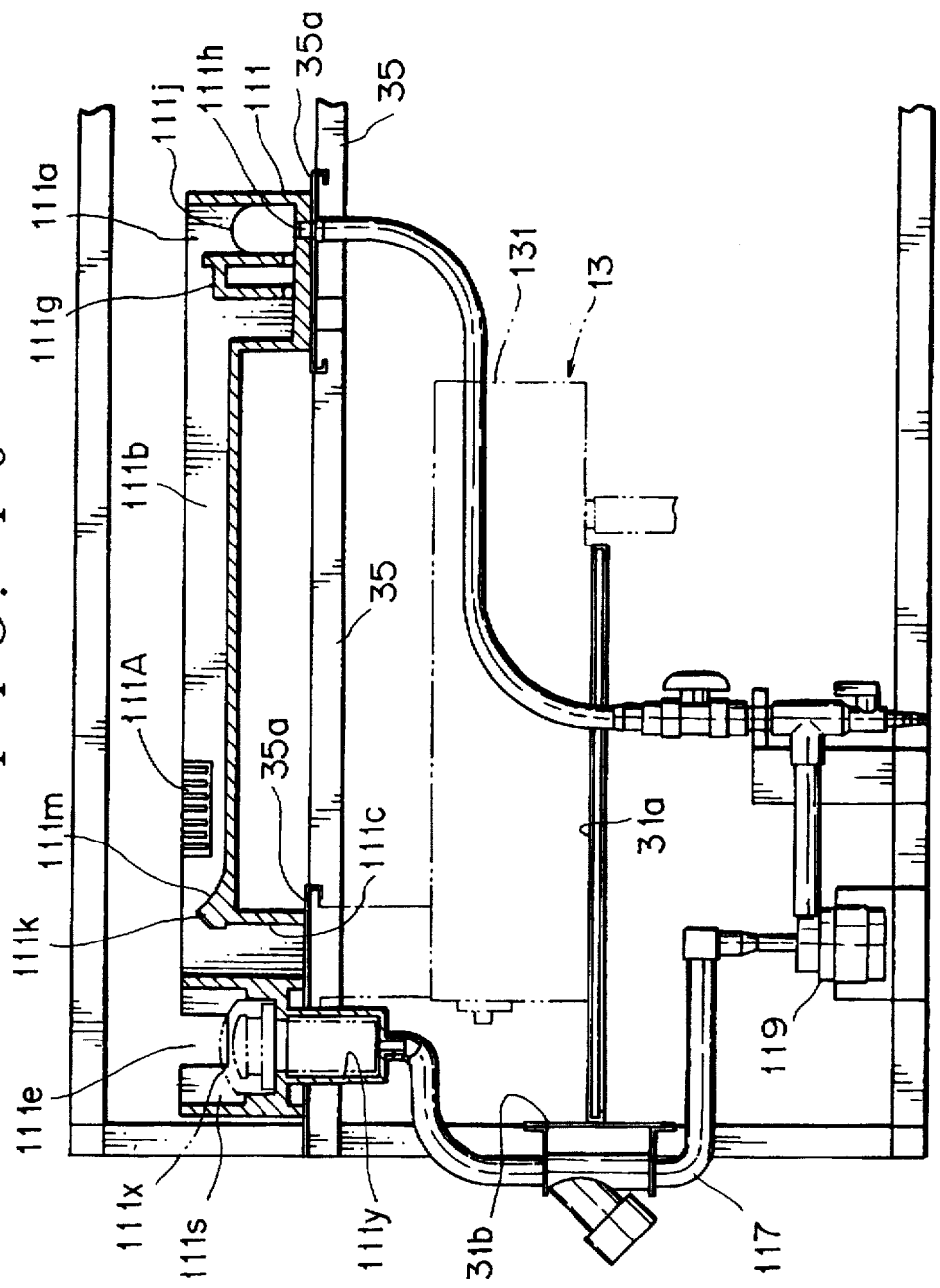
FIG. 15 is a cross-sectional view taken along the line A—A in FIG. 14.

FIG. 13 is a partially fragmented enlarged front view of the gel curing section and the gel washing section, FIG. 14 an enlarged plan view of the gel curing section, FIG. 15 a cross-sectional view taken along the line A—A in FIG. 14, and FIG. 16 a cross-sectional view taken along the line B—B in FIG. 14.

The curing vessel 111 is, as shown in FIG. 14, located right and left of the gel-coated seed processing apparatus 1 and has a width slightly wider than the nozzle block 73 of the gel processing section 7, and has a shape of substantial rectangle when observed from upside extending in forward and rearward directions of the gel-coated seed processing apparatus 1.

The both end portions of the curing vessel 111 in forward and rearward directions thereof are, as shown in FIG. 14, supported on two thin plates 35a which are mounted on the transverse reinforcing frame 35 of the main frame 31 between right and left frames thereof with an interval in between in forward and rearward directions of the gel-coated seed processing apparatus 1.

The curing vessel 111 is provided with a feed vessel portion 111a, a reaction vessel portion 111b, a seed feeding spout 111c, a discharge vessel portion 111d and a bypass 111e.

The feed vessel portion 111a is, as illustrated in FIG. 14, formed in the curing vessel 111 on the rear end side of the gel-coated seed processing apparatus 1, and the reaction vessel portion 111b is integrally formed with the feed vessel portion 111a on the front end side of the gel-coated seed processing apparatus 1, and as illustrated in FIG. 15, the bottom surface of the reaction vessel portion 111b is positioned higher than the bottom surface of the feed vessel portion 111a.

On the bottom surface of the feed vessel portion 111a at substantially central portion thereof in forward and rearward directions, a rectifying barrage with a height higher than the bottom of the reaction vessel portion 111b and lower than the upper end of the feed vessel portion 111a stands along the overall length of the feed vessel portion 111a in the transverse direction of the gel-coated seed processing apparatus 1 as illustrated in FIG. 14, and the base portion of the rectifying barrage 111g has front and rear openings.

The front end side of the gel-coated seed processing apparatus 1 from the rectifying barrage 111g, that is, a portion of the feed vessel portion 111a toward the reaction vessel portion 111b is situated below the eight valves 73b formed on the nozzle block 73 of the gel processing section 7, and on the bottom surface of the portion of the feed vessel portion 111a on the rear side of the gel-coated seed processing apparatus 1 from the rectifying barrage 111g is, as illustrated in FIG. 16, formed a feeding spout 111h, and an upwardly convex block plate 111j made of thin plastic plate with a width in transverse direction smaller than that of the curing vessel 111 is accommodated in a portion of the feed vessel portion 111a on the rear side from the rectifying barrage 111g in such a manner as to coat the feeding spout 111h.

On the bottom surface of the reaction vessel portion 111b on the front end side of the gel-coated seed processing apparatus 1 is, as illustrated in FIG. 15, formed a flashing barrage portion 111k with a shape of substantial mountain, when the gel-coated seed processing apparatus 1 is observed from side thereof, and the flashing barrage portion 111k is formed in such a manner as to be higher than the rectifying barrage 111g and lower than the upper portion of the feed vessel portion 111a.

An inclined surface 111m situated on the rear end side of the gel-coated seed processing apparatus 1 with respect to the flushing barrage portion 111k is formed to be upwardly concave circular surface.

The seed feeding spout 111c is integrally formed with the front end of the flushing barrage portion 111k in forward and rearward directions of the gel-coated seed processing apparatus 1, and as illustrated in FIG. 13, the seed feeding spout has a shape of substantial funnel which gradually narrows as descending. The seed feeding spout 111c provides passages above the curing vessel 111 and the lower portion of the curing vessel 111 which is located rearward from the thin plate 35a supporting the front end of the curing vessel 111.

In the seed feeding spout 111c is disposed a block plate 111n with a shape of substantial mountain gradually directing outside in forward and rearward directions of the gel-coated seed processing apparatus 1 as descending.

The discharge vessel portion 111d is integrally formed with a portion of the seed feeding spout 111c on the rear side of the gel-coated seed processing apparatus 1, and as illustrated in FIG. 14, the discharge vessel portion 111d is divided into two parts such as a tank holder portion 111r at right of the curing vessel 111 and a cleaning portion 111s at left of the curing vessel 111 by a partition wall 111p at about central portion of the curing vessel 111 in right and left directions thereof.

The bottom surface of the tank holder portion 111r is, as illustrated in FIG. 16, higher than the bottom surface of the feed vessel portion 111a and is slightly lower than the bottom surface of the reaction vessel portion 111b, and at substantially central portion of the bottom surface is, as illustrated in FIGS. 13 and 14, a substantially cylindrical engagement projection 111t stands with the height thereof being shorter than the upper end of the flushing barrage portion 111k. On the side wall of the tank holder portion 111r is, as illustrated in FIG. 13, mounted a flushing valve 111v.

In four corners of the bottom surface of the tank holder portion 111r are disposed spacers respectively as illustrated in FIG. 14, and the upper ends of the spacers 111w are, as shown in FIG. 16, almost flush with the upper end of the flushing barrage portion 111k.

The bottom surface of the cleaning portion 111s is higher than that of the feed vessel portion 111a, and as illustrated in FIG. 13, the bottom surface is slightly lower than that of the tank holder portion 111r. On the bottom surface of the cleaning portion 111s on slightly side wall side is disposed a filter 111x for removing seed grounds in the curing agent, and a discharge spout 111y is formed below the filter 111x.

At the front portion of the partition wall 111p on the seed feeding spout 111c side is, as shown in FIG. 14, formed a notch 111z communicating the tank holder portion 111r and the cleaning portion 111s with each other.

The bypass 111e is mounted to connect the side wall of the reaction vessel portion 111b on the feed vessel portion 111a side from the flushing barrage portion 111k and the side wall of the discharge vessel portion 111d, and the bypass 111e projects toward the side of the curing vessel 111. The side wall of the reaction vessel portion 111b to which the bypass 111e connected is, as illustrated in FIG. 15, coated with a comb-shaped lattice 111A for restricting the invasion of the gelatinizing agent particles containing seeds dropping from the valves 73b of the gel processing section 7.

The feeding spout 111h of the feed vessel portion 111a and the discharge spout 111y of the cleaning portion 111s are connected to each other with a water hose 117 and the magnetic pump 119, and to the water hose 117 upstream of the magnetic pump 119 (on the discharge spout 111y side) is connected a curing agent tank not shown through a directional control valve (not shown) for changing the routes.

The magnetic pump 119 is activated under the condition that the directional control valve changes the route to the curing agent tank to supply the curing agent in the curing tank to the feed vessel portion 111a from the feeding spout 111h through the water hose 117. Further, the curing agent flows from the feed vessel portion 111a to the cleaning portion 111s by way of the reaction vessel portion 111b, the bypass 111e, the tank holder portion 111r of the discharge vessel portion 111d, and the partition wall 111p, finally overall curing vessel 111 is filled with the curing agent up to a level between the both upper and lower ends of the flushing barrage portion 111k.

The curing agent discharged from the discharge spout 111y of the cleaning portion 111s returns to the feed vessel portion 111a from the feeding spout 111h through the water hose 117 by actuating the magnetic pump 119 under the condition that the directional control valve is changed on the discharge spout 111y side.

The gel guide mechanism 113 (corresponding to the gel guide means) is provided with a belt conveyor 113a, guide paddles 113b rotated by the belt cover 113a, a motor 113c for driving the belt cover 113a, and a power transmitting section 113d for transmitting the rotation of the motor 113c to the belt cover 113a.

The belt cover 113a is, as illustrated in FIG. 16, constructed by mounting a belt 13f between two pulleys 113e.

Each of the pulleys 113e horizontally extends with its axis directing right and left toward a portion of the feed vessel portion 111a and toward the reaction vessel portion 111b from the rectifying barrage 111g, that is, above the feed vessel portion 111a where the gelatinizing agent from the valves 73b of the gel processing section 7 drops, and above the reaction vessel portion 111b toward the feed vessel portion 111a from the flushing barrage portion 111k respectively.

The both ends of each of the pulley 113e are, as illustrated in FIGS. 2 and 3, rotatably supported at portions toward the both ends in forward and rearward directions of the two support plate 31f which extend in forward and rearward directions of the gel-coated seed processing apparatus 1, and the both ends of the support plate 31f in forward and rearward directions thereof are supported at a substantially central portion of the main frame 31 in forward and rearward directions thereof, and a portion on the bottom surface of the two base plates 31e, which are mounted slightly forward portion and between right and left frames, on the bottom surface on the inner side from the main frame 31 respectively.

The belt 113f is, as illustrated in FIG. 1, formed to have a width corresponding to the overall transverse length of the curing vessel 111.

The guide paddles 113b, as illustrated in FIG. 16, vertically stand on the surface of the belt 113f at regular intervals in a direction that the belt 113f extends, and as shown in FIG. 1, the guide paddle 113b have width corresponding to the belt 113f and the shape of rectangle, when observed from upside, with sufficiently shorter height in comparison to the width.

On each of the guide paddles 113b are, as illustrated in FIG. 1, formed many slits 113g with length of almost the same height of the guide paddle 113b at regular intervals in the transverse direction thereof.

The guide paddles 113b, as shown in FIG. 16, have suitable length of projection such that the tips of the guide paddles 113b, which project from the belt 113f opposite to the bottom surface of the reaction vessel portion 111b, face the side wall and the bottom surface of the reaction vessel portion 111b with a slight clearance between them, and the tips of the guide paddles 113b on the belt 113f rotating on the peripheral surface of the pulley 113e above the feed vessel portion 111a are apart from an inclined surface 111m with a slight clearance between them and move in such a manner as to sweep the inclined surface 111m.

The motor 113c is, as illustrated in FIG. 2, supported on the base plate 35c mounted between the two supporting plates 31f at almost central portion of the two base plates 31e in forward and rearward directions thereof.

The power transmitting section 113d consists of a reducing mechanism 113h connected to the output shaft of the motor 113c, which is supported on the base plate 35c, and a belt pulley mechanism 113j which is mounted across the output shaft of the reducing mechanism 113h and the shaft of the pulley 113e on the front side of the gel-coated seed processing apparatus 1.

The belt conveyor 113a rotates by the motion of the motor 113c and the power transmitting section 113d in a direction that the a portion of the belt 113f facing the curing agent in the curing vessel 111 moves toward the discharge vessel portion 111d side from the feed vessel portion 111a side.

The curing agent feeding mechanism 115 is provided with a reserve tank 115a and a cap 115b as illustrated in FIG. 13.

The reserve tank 115a is mounted to store thick curing agent for adjusting concentration of the curing agent in the curing vessel 111, and as illustrated in FIG. 13, and the reserve tank 115a has a shape of vertically extending substantial rectangle, and when observed from upside, as illustrated in FIG. 14, the reserve tank 115a has a dimensions so as to be accommodated in the tank holder portion 111r.

In about middle of the bottom surface of the reverse tank 115a, as illustrated in FIG. 16, is formed an opening 115c communicating inside and outside of the reserve tank 115a with each other.

Figure 17:
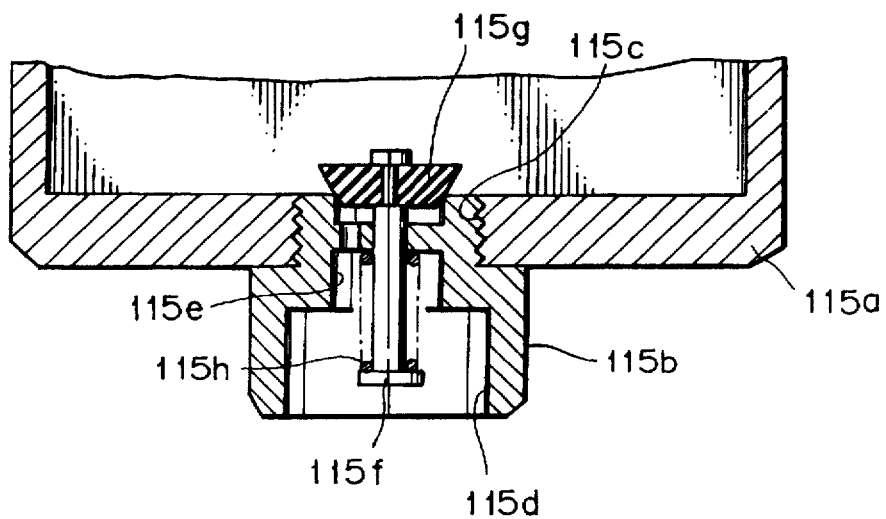
FIG. 17 is an enlarged cross-sectional view of a cap shown in FIG. 13.

The cap 115b is screwed in the opening 115c to securely close the opening 115c, and as illustrated in FIG. 17 as an enlarged cross-sectional view, the cap 115b has a concave portion 115d on the end surface exposed outside with being screwed in the opening 115c. A slide pin 115f with small diameter penetrates the concave portion 115d at a substantially central portion of the bottom thereof, and on the periphery of the bottom of the concave portion 115d through which the slide pin 115f passes is formed a through hole 115e communicating the inside and outside of the cap 115b with each other.

An end of the slide pin 115f intrudes the concave portion 115d, and the other end of the slide pin 115f is positioned inside of the cap 115b. At the other end of the slide pin 115f is fixed a rubber plug 115g with the dimension capable of closing the through hole 115e, and the slide pin 115f projects out of the cap 115b by the coil spring 115h, which is mounted between a flange at an end of the slide pin 115f and a peripheral portion of the bottom of the concave portion 115d of the slide pin 115f where the slide pin 115f penetrates, which causes the rubber plug 115g to be urged in the direction that the through hole 115e is closed.

The reserve tank 115a is constructed in such a manner that, after the cap 115b is screwed in the opening 115c, the bottom of the concave portion 115d of the cap 115b is located at a position slightly lower than the upper end of the flushing barrage portion 111k under the condition that the cap 115b is accommodated in the tank holder portion 111r while being directed downward.

The gel washing section 13 is mounted to wash the gel-coated seeds which are obtained after the gelatinizing agent reacts with the curing agent at the gel curing section 11 to be hardened, and as illustrated in FIG. 3, the gel washing section 13 is provided with a washing vessel 131, a gel guide mechanism 133 and a gel discharging mechanism 135.

The washing vessel 131 is, as illustrated in FIG. 16, formed to have a length in forward and rearward directions of the gel-coated seed processing apparatus 1 from the seed feeding spout 111c to a substantially central portion of the reaction vessel portion 111b in forward and rearward directions of the gel-coated seed processing apparatus 1, and the washing vessel 131 is supported over the support plate 31a, and bellow the curing vessel 111, and as illustrated in FIG. 13, the washing vessel 131 is situated at a substantially central portion of the main frame 31 in right and left directions thereof.

Figure 18:
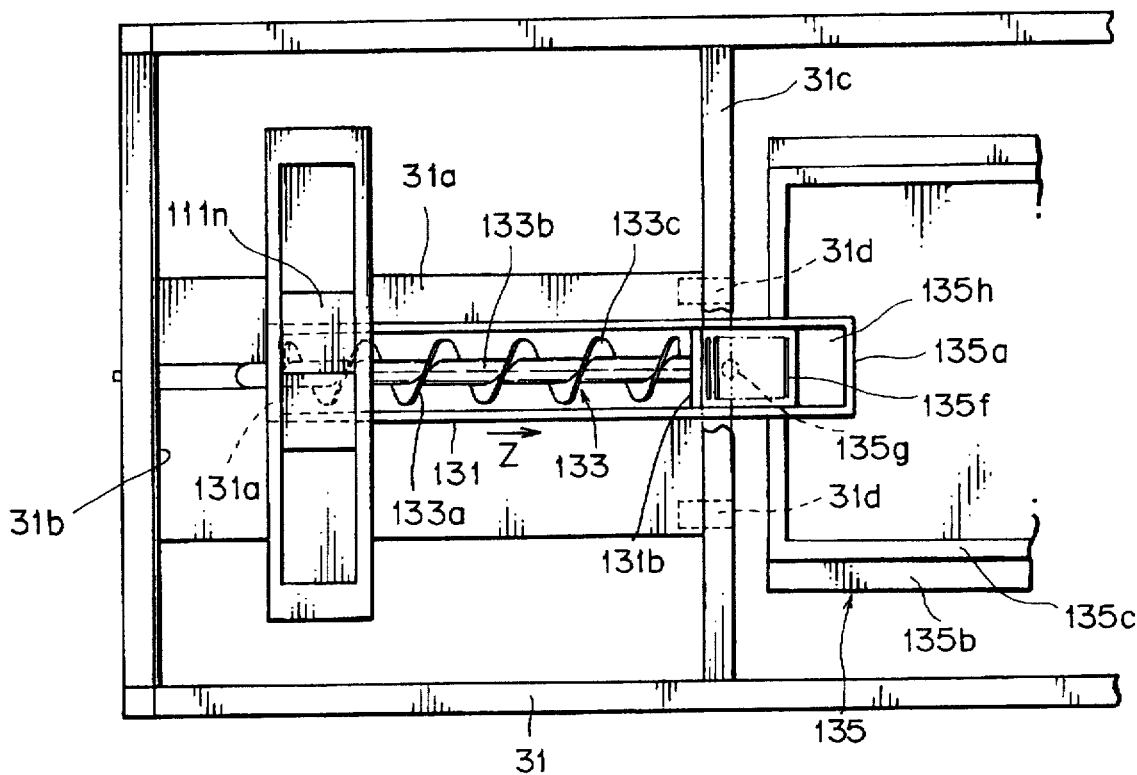
FIG. 18 is an enlarged plan view of the gel washing section shown in FIG. 1.

The support plate 31a is supported by the main frame 31 with one end of the support plate 31a secured to the thin plate 31b, which horizontally extends between the both right and left front frames below the transverse reinforcing frame 35, and with the both right and left ends of the other end of the support plate 31a fixed to the lower end of the two thin plates 31d, each of them projecting downward from portions on a reinforcing plate 31c, which is mounted between the both right and left upper frames of the main frame 31, with transverse interval in between, as illustrated in FIG. 16, and FIG. 18 as an enlarged plan view of the gel washing section.

The washing vessel 131 is provided with a substantially rectangular outer frame when observed from upside with open top and bottom portions, and a body plate 131c with a length extending in forward and rearward directions thereof from a front plate 131a to a rear plate 131b, and the body plate 131c is accommodated in the outer frame, and washing water for the gel-coated seeds after washed flows in the washing vessel 131.

The front plate 131a is, as illustrated in FIG. 13, a vertically extending substantial rectangle in front view, and at a substantially vertically central portion of the front plate 131a is formed a water feed spout 131d communicating inside of the washing vessel 131.

Figure 19:
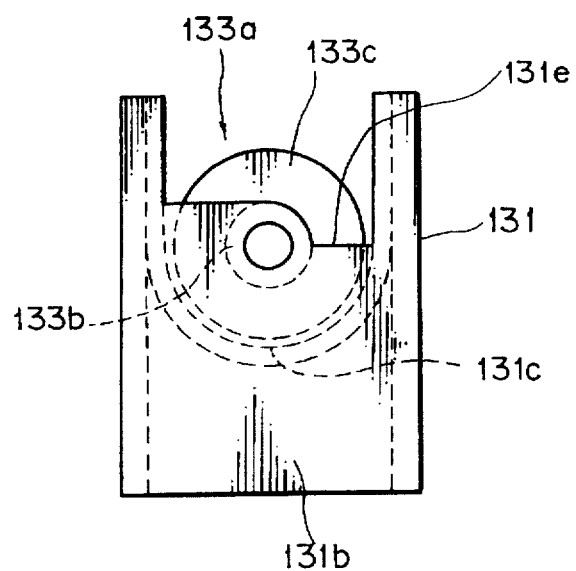
FIG. 19 is an enlarged rear view of a rear plate of a washing vessel shown in FIG. 18.

The rear plate 131b, as illustrated in FIG. 19 as an enlarged rear view, has a shape that a substantially inversely L-shaped notch 131e is formed on the upper half portion of the front plate 131a, and the body plate 131c is formed, in a front view, to substantially be a character U with a top opening and semi-circular lower portion.

As illustrated in FIG. 16, between the outer surface apart from the body plate 131c in forward and rearward directions thereof and the support plate 31a are mounted the reinforcing plates 131f respectively.

Reference symbol 131g in FIG. 16 shows a plug for the washing water which is provided at the lower portion of the body plate 131c on the front plate 131a side.

The gel guide mechanism 133 (corresponding to the second gel guide means) is provided with a screw feeder 133a and a motor (not shown) for rotating the screw feeder 133a.

The screw feeder 133a is, as shown in FIG. 18, provided with a shaft 133b and a spiral blade 133c, and the shaft 133b extends in the middle of the lower portion of the body plate 131c, and the both ends thereof are rotatably supported by the front plate 131a and the rear plate 131b respectively.

The spiral blade 133c is mounted on the outer surface of the shaft 133b between the front plate 131a and the rear plate 131b.

The motor not shown is, as illustrated in FIG. 16, connected to the shaft 133b through a gear 133d attached to a shaft 133b which penetrates the front plate 131a and extends forward from the washing vessel 131, and reduction gears not shown engaging the gear 133d.

The screw feeder 133a rotates in the direction that the gel-coated seeds is transported from the front plate 131a side to the rear plate 131b side in the washing vessel 131 through the motor, the reduction gears, and the gear 133d.

The gel discharging mechanism 135 is provided with a flushing box 135a, a drain pan 135b and a seed receiving basket 135c.

The flushing box 135a is integral with the rear surface of the thin plate 31b, and has a suitable length in the forward and rearward directions of the gel-coated seed processing apparatus 1 and a shape of substantial rectangle with top and bottom openings when observed from upside, and as illustrated in FIG. 18, the flushing box 135a has a length in the transverse direction corresponding to the width of the washing vessel 131 in the transverse direction of the gel-coated seed processing apparatus 1.

On the bottom of the flushing box 135a in substantially center in the forward and rearward directions of the gel-coated seed processing apparatus 1 is, as illustrated in FIG. 16, stands the locking wall 135d, and the between the upper end of the locking wall 135d and the lower end of the notch 131e on the rear surface of the rear plate 131b is mounted a flushing plate 135e, which is inclined so as to lower from the rear plate 131b as directing toward the locking wall 135d, and the lower end of the flushing plate 135e engages the corner on the rear plate 131b side of the locking wall 135d.

On the flushing plate 135e between the upper end of the locking wall 135d and the rear plate 131b are, as illustrated in FIG. 18, formed many transversely extending slits 135f with length of overall transverse length of the flushing box 135a at intervals in the forward and rearward directions of the gel-coated seed processing apparatus 1 in such a manner as to prevent the passage of gel-coated seeds from the washing vessel 131 and allow the passage of water.

On the bottom surface of the flushing box 135a on the rear plate 131b side from the locking wall 135d is, as illustrated in FIG. 16, formed a discharging spout 135g for discharging the water passing through the slits 135f of the flushing plate 135e, and on the bottom surface of the flushing box 135a opposite to the discharging spout 135g with the locking wall 135d in between is formed a seed discharge spout 135h which can be opened and closed.

The drain pan 135b has a shape of thin and rectangular saucer with upward opening and has a length in the forward and rearward directions of the gel-coated seed processing apparatus 1 from the lower portion of the flushing box 135a to the rear end of the main frame 31, and the drain pan 135b is thinner than the main frame 31 in width. The both ends of the drain pan 135b in the forward and rearward directions of the gel-coated seed processing apparatus 1 are supported on the lower frame portions which are mounted right and left at the rear end and intermediate portion in the forward and rearward directions of the gel-coated seed processing apparatus 1.

On the bottom surface in the drain pan 135b is formed a discharge spout (not shown), and the discharge spout is in communication with the drain valve 135j on the right side surface of the drain pan 135b.

The seed receiving basket 135c has a shape of substantial rectangle with an upward opening when observed from upside, and the seed receiving basket 135c has a mesh preventing the passage of the gel-coated seed and has a shape, when observed from upside, and dimensions so as to be installed in the drain pan 135b.

Next, the motion (working) of the gel-coated seed processing apparatus 1 according to this embodiment with the above-mentioned construction will be explained.

At the start of the coating of the seeds with gel, at first, among a plurality kinds of adapters 53g, an adapter 53g with the inner diameter of the small diameter portion 53j most suitable for the kind, that is, dimensions, of the seed to be processed may be selected, and such adapters 53g are attached to the eight through holes 53f on the tank main body 53b of the seed tank 53.

Similarly, among a plurality of plungers 73h, a plunger 73h with the outer diameter of the small diameter portion 73k most suitable for the dimensions of the seed to be processed is selected, and the cylindrical plungers 73h are accommodated in the eight passages 73c of the nozzle block 73 in the gel processing section 7, and then, the coil spring 73r is accommodated in each of the passage 73c and the cap 73s is screwed therein.

Further, among a plurality of suction tips 95, a suction tip 95 with the outer diameter and the inner diameter of the suction passage most suitable for the dimensions of the seed to be processed is selected, and the suction tips 95 are mounted to the eight through holes 93b of the manifold 93 in the seed transporting section 9 respectively.

Next, the switch of a power source not shown of the gel-coated seed processing apparatus 1 is turned on to retract each of the pressure air cylinder 77 of the gel accommodating block 75.

Further, the air cylinder 94d of the elevating mechanism 94 is retracted to lift the sustaining plate 94c on the base plate 91a side and the rodless magnetic cylinder 91b causes the piston mount 91j to slide rearward, which permits the manifold 93 to move the rear position.

Then, upon turning on the switch of the power source, the vacuum pump 97 is actuated to start the suction of the air from the suction passage of the suction tip 95 to the vacuum pump 97 by way of the manifold 93, the joint 93a, 94j and high pressure hoses not shown.

At that moment, since the manifold 93 is disposed between the vacuum pump 97 and each of the suction tips 95, and the air is sucked from each of the suction tips 95 through the manifold 93, the suction pressure at the suction tips 95 are equalized.

Upon turning the switch of the power source, the curing agent in the curing agent tank is fed to the curing vessel 111 by the magnetic pump 119 under the condition that the directional control valve is converted on the curing agent tank side.

At that moment, the curing agent flowing into the feed vessel portion 111a from the feeding spout 111h flows over the rectifying barrage 111g, or passes through openings at an interval in the forward and rearward directions of the base portion of the rectifying barrage 111g so as to flow into the feed vessel portion 111a opposite to the feeding spout 111h side from upside and downside of the rectifying barrage 111g, and the curing agent flows into the reaction vessel portion 111b side to fill the overall curing vessel 111.

The motion of the magnetic pump 119 stops once at the moment the amount of the curing agent fed from the curing agent tank reaches the amount causing the level of water in the curing vessel 111 to reach a predetermined level between the both upper and lower ends of the flushing barrage portion 111k, and the magnetic pump 119 is driven again after the directional control valve is turned on the discharge spout 111y side.

As a result, after a predetermined amount of curing agent is fed from the curing agent tank to the curing vessel 111, the curing agent discharged from the discharge spout 111y of the cleaning portion 111s returns in the feed vessel portion 111a from the feeding spout 111h through the water hose 117.

Then, when the curing agent fed from the curing agent tank fills the overall curing vessel 111, and when the curing agent returns in the feed vessel portion 111a from the discharge spout 111y of the cleaning portion 111s through the water hose 117 and the feeding spout 111h, the curing agent in the feed vessel portion 111a flows in the reaction vessel portion 111b side from upside and downside of the rectifying barrage 111g, so that in the curing vessel 111 is generated a flow of the curing agent directing the reaction vessel portion 111b, the bypass 111e, the tank holder portion 111r of the discharge vessel portion 111d and the cleaning portion 111s from the feed vessel portion 111a.

Next, when a prescribed amount of curing agent supplied from the curing agent tank causes the water level in the curing vessel 111 to reach a predetermined level between the both upper and lower ends of the flushing barrage portion 111k, the reserve tank 115a is accommodated in the tank holder portion 111r with the cap 115b directing downward.

As a result, the engagement projection 111t of the tank holder portion 111r is inserted into the concave portion 115d of the cap 115b, and the tip of the engagement projection 111t contacts the slide pin 115f to press the slide pin 115f to inside of the cap 115b against the urging force of the coil spring, and the rubber plug 115g is apart from the through hole 115e of the cap 115b to form a clearance between the through hole 115e and the peripheral surface of the slide pin 115f.

Then, the position of the through hole 115e of the cap 115b which is opened when the rubber plug 115g is apart from the through hole 115e is slightly higher than the tip of the slide pin 115f which is pressed by the engagement projection 111t. On the other hand, as described above, the level of the curing agent in the curing vessel 111 reaches a predetermined level between the both upper and lower ends of the flushing barrage portion 111k, therefore, in the present level of the curing agent, thick curing agent in the reserve tank 115a does not flow out of the curing vessel 111.

Then, the motor 113c of the gel guide mechanism 113 in the gel curing section 11 is driven to start the rotation of the belt cover 113a along the flow of the curing agent in the curing vessel 111.

Further, a motor not shown of the gel washing section 13 is driven to start the rotation of the screw feeder 133a, which causes the water in the washing vessel 131 to direct from the front plate 131a side to the rear plate 131b side and finally to slightly overflow from the notch 131e of the rear plate 131b.

As a result, the gel-coated seeds in the washing vessel 131 are transported from the front plate 131a to the rear plate 131b.

The washing water overflown from the notch 131e of the rear plate 131b enters the flushing box 135a and passes through the slits 135f of the flushing plate 135e, and is discharged from the discharging spout 135g to outside of the washing vessel 131, and the water returns to the washing vessel 131 from the water feed spout 131d again.

Upon switching on the power source, an air compressor not shown applies positive pressure to the inside of the gelatinizing tank to transport the gelatinizing agent from the gelatinizing tank to the manifold 79 through the high pressure hoses, the pump, and the detachable joint 79a, and the gelatinizing agent transported by the pressure is filled in the manifold 79.

Then, the gelatinizing agent filled in the manifold 79 is further transported by the pressure to each of the passage 75a corresponding to the gel accommodating block 75 from the lower end thereof by way of the eight joints 79b.

At that moment, the manifold 79 is disposed between the gelatinizing agent tank and the gel accommodating block 75, and through the manifold 79 is fed the gelatinizing agent to each of the passage 75a of the gel accommodating block 75, so that the pressure to feed the gelatinizing agent to the gel passages 75a are unified, which permits a predetermined, the same amount of gelatinizing agent is fed in accordance with the capacity thereof.

Then, before feeding the gelatinizing agent to each of the passages 75a, the air extracting valve 78 is opened to extract air from the upper portion of the passage 75a to which the gelatinizing agent is fed from the lower end side thereof.

Subsequently, the gelatinizing agent is filled in each of the space 73m of each of the passages 73c corresponding to the nozzle block 73 from the inside of each of the passages 75a through the through holes 75b, 75n by the pressure for the transportation in the gelatinizing agent tank, after the gelatinizing agent is filled in the space 73m without no space therein the air extracting valve 78 is closed.

At the supply of the gelatinizing agent to each of the passages 75a, reverse flow of the gelatinizing agent to the manifold 79 side is prevented by the check valve 75d0 at lower end of each of the passages 75a.

Then, in this state, the pressure air cylinder 77 is stretched to pressurize the inside of the passage 75a, allowing the space 73m to be pressurized through the through holes 75b, 73n with the gelatinizing agent therein.

Then, the cylindrical plunger 73h is elevated in the passage 73c against the urge by the resilient force of the coil spring 73r to open the valves 73b which are closed by the lower end of the small diameter portion 73k, and a prescribed amount of gelatinizing agent filled in the space 73m is pressed from the valves 73b to the lower portion of the nozzle block 73 and becomes particles to drop.

When the pressure air cylinder 77 is retracted in synchronization with the drop of the gelatinizing agent from the valves 73b, the amount of gelatinizing agent in the space 73m decreases due to the drop of the gelatinizing agent, so that the pressure in the space 73m also decreases. As a result, the resilient force of the coil spring 73r becomes larger than the pressure in the space 73m, which allows the cylindrical plunger 73h to fall in the passage 73c due to the urge of the coil spring 73r and the valves 73b are closed by the lower end of the small diameter portion 73k.

When the valves 73b are closed, gelatinizing agent adhered to the valves 73b and the lower end of the small diameter portion 73k form film of the gelatinizing agent at the lower end of the small diameter portion 73k.

The gelatinizing agent decreased by the drop from the valves 73b is supplied to each of the passages 75a by way of the manifold 79 by the transportation through pressure from the gelatinizing agent tank.

Next, the seeds to be processed are fed in the hopper portion 53c of the seed tank 53 in the seed feeding section 5.

Then, the seeds fed are rotate and slide on the inclined portion of the rear plate 53v and are accommodated in the tank main body 53b from the slit 53e.

At that moment, the amount of seeds passing through the slit 53e is restricted to a predetermined amount which is determined by the height H1 of the slit 53e, therefore, the amount of the seeds in the tank main body 53b is substantially constant regardless of the amount of seeds fed in the hopper portion 53c.

Further, the distance H3 between the inner peripheral surface of the bottom of the tank main body 53b and the air chamber 53m has some relation to the restriction of the amount of seeds which are fed from inside of the hopper portion 53c and are accommodated in the tank main body 53b.

After the seeds are accommodated in the tank main body 53b, an air compressor not shown is operated to supply compressed air to the air chamber 53m through the manifold 53r.

Then, the compressed air is blown from each of the blowing spouts 53n of the air chamber 53m, and air stream in the tank main body 53b caused by the compressed air which rotates from the lower end of the tank main body 53b toward the front end, the upper end and the rear end thereof agitates the seeds in the tank main body 53b.

In this embodiment, the manifold 53r is disposed between the air compressor and the air chamber 53m, and by way of the manifold 53r is supplied compressed air to each of the blowing spouts 53n, so that the pressure of the compressed air blown from each of the blowing spouts 53n are equalized.

Further, in this embodiment, the amount of seeds agitated in the tank main body 53b is determined by the amount of seeds to be processed which pass between the air chamber 53m and the inner peripheral surface of the bottom of the tank main body 53b and then direct from the bottom end of the tank main body 53b toward the front end thereof by the air stream rotating from the lower end toward the front end, the upper end and the rear end of the tank main body 53b, that is, the amount of the seeds agitated in the tank main body 53b is determined by the vertical distance H3 between the air chamber 53m and the inner peripheral surface of the bottom of the tank main body 53b.

Then, the air cylinder 94d of the elevating mechanism 94 is stretched with the manifold 93 placed at the rear portion, and the sustaining plate 94c is lowered so as to be apart from the base plate 91a to position the tip portion of each of the suction tips 95 at height immediately before contacting the tiered portion 53k of the corresponding adapter 53g of the tank main body 53b.

Then, the seeds agitated in the tank main body 53b are sucked and sustained when approaching each of the through holes 53f.

Then, after a predetermined time passes from the stretching of the air cylinder 94d, the air pressure in the manifold 98 is measured by the pressure sensor 97c, and in case that the air pressure exceeds the prescribed value, it is judged that suction pressure of at least a part of the suction tip 95 does not fall up to the suction pressure under the condition that the seeds are sucked and sustained and not all of the suction tips 95 suck and sustain the seeds, therefore, the suction of the air by the 97 stops, and after that, the air cylinder 94d is retracted to lift the sustaining plate 94c on the base plate 91a side and to return in the initial state.

The vacuum pump 97 starts again after the air cylinder 94d is retracted.

Then, in case that the air pressure in the manifold 98 measured by the pressure sensor 97c is maintained below the prescribed value, the vacuum pump 97 does not stop, and the air cylinder 94d is retracted with the seeds sucked and sustained by all suction tips 95 to lift the sustaining plate 94c to the base plate 91a side.

During the motion that the seeds are sucked and sustained by the suction tip 95, the inside of the tank main body 53b communicates the outside thereof through the slight clearance between the tip portion of each of the suction tip 95 and the adapter 53g, so that a part of the air stream formed inside of the tank main body 53b by the compressed air blown from each of the blowing spouts 53n directs out of the tank main body 53b from the slight clearance between the tip portion of each of the suction tips 95 and the through hole 53A of the adapter 53g.

As a result, a part of the seeds to be processed which are agitated in the tank main body 53b is carried on a part of the air stream directing out of the tank main body 53b and is guided to a portion adjacent to the through hole 53A of the adapter 53g.

During the motion of sucking and sustaining of the seeds by each of the suction tips 95, in the tank main body 53b, air stream generated by the blowing of the compressed air from each of the blowing spouts 53n rotates not only the seeds but also seed grounds, which are generated when the seeds contact the inner wall of the tank main body 53b, and dust such as one suspending in the air, which invade in the tank main body 53b through the adapter 53g together with the seeds, therefore, it is possible for the suction tips 95 to suck the dust.

However, dust in the air, which are induced by the suction tip 95, are removed through the air filter 99 neighboring the vacuum pump 97 to clear the air, therefore, no clogging of the suction tip 95 nor excess heat and the like due to excess load of the vacuum pump 97 occur.

Then, at the replacement of the adapter 53g in the seed feeding section 5 and the maintenance of the seed tank 53, the slide plate 51c is moved along the guide channel 51b of the base 51 with the handle 51d being grasped and the seed tank 53 is drawn outer right of the main frame 31, which allows the maintenance work and the like to be carried out without being interrupted by the seed transporting section 9 above the seed feeding section 5.

After the sustaining plate 94c is lifted toward the base plate 91a by the retraction of the air cylinder 94d with the seeds sucked and sustained by each of the suction tips 95, the piston mount 91j slides forward through the rodless magnetic cylinder 91b to move the manifold 93 forward.

Further, the air cylinder 94d is stretched to lower the sustaining plate 94c in such a manner as to be apart from the base plate 91a, and the tip portion of each of the suction tips 95 is situated at the height where it can be inserted into the passage 73v of the cylindrical plunger 73h in the passage 73c from each of the seed feeding spouts 73a corresponding to the nozzle block 73.

After that, the suction of the air through the vacuum pump 97 stops to release the suction and sustainment of the seeds by each of the suction tips 95, and further, positive pressure is applied to each of the suction tip 95 to cause the seed on each of the suction tips 95 drop to be fed in the passage 73v of corresponding plunger 73h.

After the operation of the vacuum pump 97 stops and the seeds sucked and sustained by each of the suction tips 95 drop and are fed in the passage 73v of each of the cylindrical plunger 73h, the sustaining plate 94c is lifted toward the base plate 91a side by the retraction of the air cylinder 94d, and subsequently, the rodless magnetic cylinder 91b causes the piston mount 91j to slide rearward, allowing the manifold 93 to move to the rearward position to return in the initial state.

As clearly understood from the explanation described above, the direction of the transportation, when observed from above, at the transportation of the seeds from the seed feeding section 5 to the gel processing section 7 by the seed transporting section 9, that is, the horizontal component of a vector showing the transportation is indicated by arrows in FIGS. 4 and 7.

As described above, after the seed sucked and sustained by each of the suction tips 95 drops to be fed, the seed rides on the film of the gelatinizing agent which is formed at the lower end of the small diameter portion 73k of the cylindrical plunger 73h, and in synchronization with this motion, the pressure air cylinder 77 is stretched.

As a result, the space 73m is increased in pressure through the passage 75a and the through holes 75b, 73n to open the valves 73b due to the elevation of the cylindrical plunger 73h, and a prescribed amount of gelatinizing agent in the space 73m is pushed from the valves 73b to the lower portion of the nozzle block 73 through the inner pressure of the space 73m, which allows the seed at the lower end of the small diameter portion 73k contacts the gelatinizing agent film. As a result, the gelatinizing agent drops while coating the seed to be a gel-coated seed particle and reaches at a portion in the curing vessel 111 below the base plate 71.

At that moment also, the reverse flow of the gelatinizing agent from the gel accommodating block 75 to the manifold 79 can be prevented by the check valve 75d.

After that, the pressure air cylinder 77 is retracted to lower the cylindrical plunger 73h, which permits the valves 73b to be closed. As a result, the film of the gelatinizing agent is formed at the lower end of the small diameter portion 73k, and the gelatinizing agent decreased due to the drop of the gel-coated seeds is supplied to each of the passages 75a through the manifold 79 by the pressure transportation from the gelatinizing agent tank.

The motions in the seed feeding section 5, the gel processing section 7 and the seed transporting section 9 described above are performed in synchronization with each other by the control with sequencer not shown, and the repeated motions at those sections simultaneously produce eight gel-coated seeds in which seeds are coated into particles under one process. The eight seeds produced are, as described above, drop in the curing vessel 111 below the base plate 71 at the feed vessel portion 111a on the reaction vessel portion 111b side from the rectifying barrage 111g and enter the curing agent.

On the other hand, when the gel-coated seeds drop and enter the curing agent at the feed vessel portion 111a of the curing vessel 111 on the reaction vessel portion 111b side from the rectifying barrage 111g, the gel-coated seeds ride on the stream in the curing vessel 111 to move in the curing agent toward reaction vessel portion 111b. Upon moving in the reaction vessel portion 111b on the flushing barrage portion 111k side, in accordance with the rotation of the belt cover 113a, the gel-coated seeds are pressed from the feed vessel portion 111a side by the guide paddle 113b, which enter the curing agent, and the gel-coated seeds are guided in the curing agent on the flushing barrage portion 111k side.

During the above-mentioned motion, the movement of the guide paddle 113b in the curing agent causes the curing agent in the reaction vessel portion 111b to run off toward the feed vessel portion 111a side from the guide paddle 113b through the slit 113g or narrow clearances between the guide paddle 113b and side walls and bottom surface of the reaction vessel portion 111b.

As a result, it is prevented that the movement of the guide paddle 113b in the curing agent greatly disturbs the flow of the curing agent or the curing vessel 111 is overflowed with the curing agent, or the curing agent flow over the flushing barrage portion 111k to enter the seed feeding spout 111c.

Then, when the gel-coated seeds in the curing agent are guided to the reaction vessel portion 111b before the flushing barrage portion 111k by the guide paddle 113b, in accordance with the rotation of the belt 113f along the periphery of the pulley 113e, the guide paddle 113b inversely rotates upward in such a manner that the tip portion thereof moves along the inclined surface 111m of the flushing barrage portion 111k with slight clearance between them.

In accordance with the reverse rotation of the guide paddle 113b upward, the gel-coated seeds in the curing agent rides on the inclined surface 111m of the flushing barrage portion 111k while being pressed by the guide paddle 113b, and at the moment or immediately before the end of the guide paddle 113b exceeds the top of the flushing barrage portion 111k in height, the gel-coated seeds rotate on the surface opposite to the inclined surface 111m of the flushing barrage portion 111k so as to be fed to the seed feeding spout 111c.

As described above, before fed into the seed feeding spout 111c, the gel-coated seeds which drop from the valves 73b of the cylindrical plunger 73h of the nozzle block 73 are immersed in the curing agent in a predetermined period of time, during the immersion, the gelatinizing agent coating the seeds react with the curing agent to be gel-coated seeds, and the gel-coated seeds drop in the front plate 131a below the seed feeding spout 111c at a portion thereof on the front plate 131a side without fail even if the curing agent slightly adhere to the surface of the seeds since the both right and left inner walls of the seed feeding spout 111c and the block plate 111n are inclined.

As clearly understood from the aforementioned explanation, the direction that the coated seeds are guided, when observed from above, toward the seed feeding spout 111c over the flushing barrage portion 111k from the feed vessel portion 111a in the curing agent by the gel guide mechanism 113 of the gel curing section 11, that is, the direction of the horizontal component of a vector indicating the movement of the guide is indicated by the arrow Y in FIG. 16.

As the coated seed particles drop from the valves 73b of the cylindrical plunger 73h of the nozzle block 73 are immersed in the curing agent in a predetermined period of time, the concentration of the curing agent lowers and total amount thereof is decreased, which causes the level of the curing agent in the curing vessel 111 to lower the predetermined level between the both upper and lower portions of the flushing barrage portion 111k and to become lower than the position of the through hole 115e of the cap 115b which is opened due to the release of the rubber plug 115g.

As a result, the thick curing agent in the reserve tank 115a flows in the tank holder portion 111r from the clearance between the peripheral surface of the slide pin 115f, which is pressed by the abutment with the engagement projection 111t of the tank holder portion 111r, and the through hole 115e of the cap 115b, and the thick curing agent is mixed with the curing agent in use, which flows into the tank holder portion 111r by way of the bypass 111e from the reaction vessel portion 111b and is obtained after the hardened coated seeds are removed.

Then, the flowout of the thick curing agent from the reserve tank 115a causes the curing agent in the curing vessel 111 to increase, and the level of the curing agent returns to the prescribed position, permitting the level to become higher than the position of the through hole 115e of the cap 115b which is opened due to the release of the rubber plug 115g and to stop the flowout of the curing agent toward the curing vessel 111.

As described above, the level of the curing agent in the curing vessel 111 is always maintained at a prescribed level between the both upper and lower ends of the flushing barrage portion 111k, and the concentration of the curing agent is also always maintained so as to be suitable for curing the coated seeds.

Subsequently, the gel-coated seeds that are dropped in the front plate 131a at a portion slightly toward the front plate 131a are guided toward the rear plate 131b by the stream of water directing the rear plate 131b from the front plate 131a, which is generated in the washing vessel 131 by the rotation of the screw feeder 133a activated by a motor not shown, and apparent movement of the spiral blade 133c below water level from the front plate 131a side to the rear plate 131b side caused by the rotation of the screw feeder 133a.

When the gel-coated seeds reach just before the rear plate 131b, the gel-coated seeds are picked up from the washing water by a portion of the spiral blade 133c on the rear plate side, which moves upward from inside of the washing water in accordance with the rotation of the screw feeder 133a.

Until the gel-coated seeds are picked up from inside of the washing water by the portion of the spiral blade 133c, the gel-coated seeds, which drop in the front plate 131a at a portion thereof toward the front plate 131a from the seed feeding spout 111c of the curing vessel 111, are washed while being transported and immersed in the washing water for a prescribed period of time.

The gel-coated seeds after washed rotate on the spiral blade 133c along the inclination thereof since a portion of the spiral blade 133c where the gel-coated seeds are picked up gradually lowers as approaching the rear plate 131b by the rotation of the screw feeder 133a after the gel-coated seeds are picked up from the washing water, and the gel-coated seeds ride over the lower end of the notch 131e of the rear plate 131b to be released on the flushing plate 135e.

After discharged from the tank main body 53b of the seed tank 53 and until fed to the seed feeding spout 111c of the curing vessel 111, eight seeds or gelatinizing agent coating the seeds to be particles are parallelly transported, move, and are processed substantially in line with each other in the transverse direction of the gel-coated seed processing apparatus 1. However, the gelatinizing agent particles fed to the seed feeding spout 111c are formed in a group since the width in the transverse direction of the gel-coated seed processing apparatus 1 gradually narrows as going downward, therefore, the eight seeds are simultaneously washed at the gel washing section 13.

On the flushing plate 135e, the spiral blade 133c drop a little washing water released on the flushing plate 135e together with the gel-coated seeds and the washing water adhered to the surface of the gel-coated seeds through the slit 135f to discharge them from the discharging spout 135g out of the flushing box 135a.

Further, the gel-coated seeds released on the flushing plate 135e, and of which water thereon is removed, rotate on the flushing plate 135e along the inclination thereof, and are discharged out of the flushing box 135a from the seed discharge spout 135h to be accommodated in the seed receiving basket 135c.

Then, in the seed receiving basket 135c, remaining washing water adhered to the surface of the gel-coated seeds flow off through meshes of the seed receiving basket 135c through own weight thereof toward the bottom surface of the drain pan 135b to discharge the water from the discharging spout out of the drain pan 135b by way of the drain valve 135j.

As clearly understood from the above explanation, the direction that the gel-coated seeds are guided, when observed from above, toward the notch 131e of the rear plate 131b from the front plate 131a side in the washing water in the washing vessel 131, that is, the direction of the horizontal component of a vector indicating the movement of the guide is indicated by the arrows Z in FIGS. 16 and 18.

As described above, with the gel-coated seed processing apparatus 1 according to the present embodiment, the gel curing section 11 with the gel guide mechanism 113 is disposed in relation to the gel processing section 7 and the seed transporting section 9 in such a manner that the direction Y that the coated seeds in the curing agent in the curing vessel 111 are guided by the gel guide mechanism 113 is in parallel with the direction X that the seeds are transported by the seed transporting section 9, so that the direction X that the seeds are transported by the seed transporting section 9 and the direction Y that the coated seeds in the curing agent in the curing vessel 111 are guided by the gel guide mechanism 113 coincide with each other to unify the both directions.

As a result, the maintenance of the gel processing section 7, the seed transporting section 9 and the gel curing section 11 may completely be carried out from one side of the gel-coated seed processing apparatus 1, so that the space for maintenance which should be prepared around the gel-coated seed processing apparatus 1 can be limited to a prescribed side thereof, and it is unnecessary to prepare the space for maintenance around the other side surfaces, front surfaces and rear surfaces, which remarkably reduces the space that the gel-coated seed processing apparatus 1 is installed.

Further, from one side, for instance, of the gel-coated seed processing apparatus 1, the maintenance of the gel processing section 7, the seed transporting section 9 and the gel curing section 11 can be carried out, so that it is unnecessary for a worker conducting the maintenance to move to positions around different faces of the gel-coated seed processing apparatus 1 in accordance every time he or she changes the portion to be maintained, resulting in improved maintainability.

Further, with the gel-coated seed processing apparatus 1 according to the present embodiment, the suction tip 95, the nozzle block 73, the gel accommodating block 75 and the pressure air cylinder 77 composing gel processing section 7 for coating the seeds with gelatinizing agent, and the air extracting valve 78 are parallelly disposed in eight sets in the transverse direction of the gel-coated seed processing apparatus 1 crossing the direction X that the seeds are transported by the seed transporting section 9 to transport the seeds from the seed feeding section 5 to the gel processing section 7 and to coat the seeds with the gelatinizing agent parallelly in eight lines.

As a result, the capacity of a series of processes until the production of coated seeds in gel-coated seed manufacturing is increased, in its turn, the total capacity of the gel-coated seed processing apparatus 1 can be increased.

Further, with the gel-coated seed processing apparatus 1 according to the present invention, the curing vessel 111 and the belt cover 113a of the gel guide mechanism 113 are formed so as to have a width corresponding to the transverse length of the manifold 93 to which eight suction tips 95 for transporting the seed from the seed feeding section 5 to the gel processing section 7 are mounted, and the guide of the coated seeds in the curing agent in the curing vessel 111 by the belt cover 113a is simultaneously carried out for eight seeds which are fed from the eight seeds to the curing vessel 111.

As a result, in addition to a series of processes to the coating of seeds with gelatinizing agent in the seed feeding section 5, the seed transporting section 9 and the gel processing section 7, curing treatment of the coated seeds at gel curing section 11 are simultaneously conducted parallelly in eight lines, resulting in further increase in the total capacity of the gel-coated seed processing apparatus 1.

Further, with the gel-coated seed processing apparatus 1 according to the present embodiment, when the gel coated seeds, which are obtained through the hardening of the gelatinizing agent on the coated seeds through reaction with the curing agent in the curing vessel 111, are guide by the gel guide mechanism 133 in the washing water in the washing vessel 131 while being washed, the direction that the gel-coated seeds are guided in the washing water by the gel guide mechanism 133 coincides with the direction X that the seeds are transported from the seed feeding section 5 to the seed transporting section 9 through the gel processing section 7 as well as the direction Y that the coated seeds fed from the seed transporting section 9 to the curing vessel 111 are guided in the curing vessel 111 by the gel guide mechanism 113 to unify those directions.

As a result, in addition to the maintenance of the gel curing section 11 with the gel processing section 7, the seed transporting section 9 and the gel guide mechanism 113, it is possible to perform the maintenance of the gel washing section 13 with the gel guide mechanism 133 from one side of the gel-coated seed processing apparatus 1 for instance, which reduces the installation space of the gel-coated seed processing apparatus 1 and further improves the maintainability of the gel-coated seed processing apparatus 1.

In this embodiment, the amount of seeds, which are fed from the hopper portion 53c of the seed feeding section 5 and are accommodated in the tank main body 53b, has no relationship with the amount of seeds, which are fed in the hopper portion 53c, and is determined by the height H1 of the slit 53e penetrating the hopper portion 53c and the tank main body 53b, and has some relation with the distance H3 between the inner peripheral surface of the bottom of the tank main body 53b and the air chamber 53m.

Figure 20:
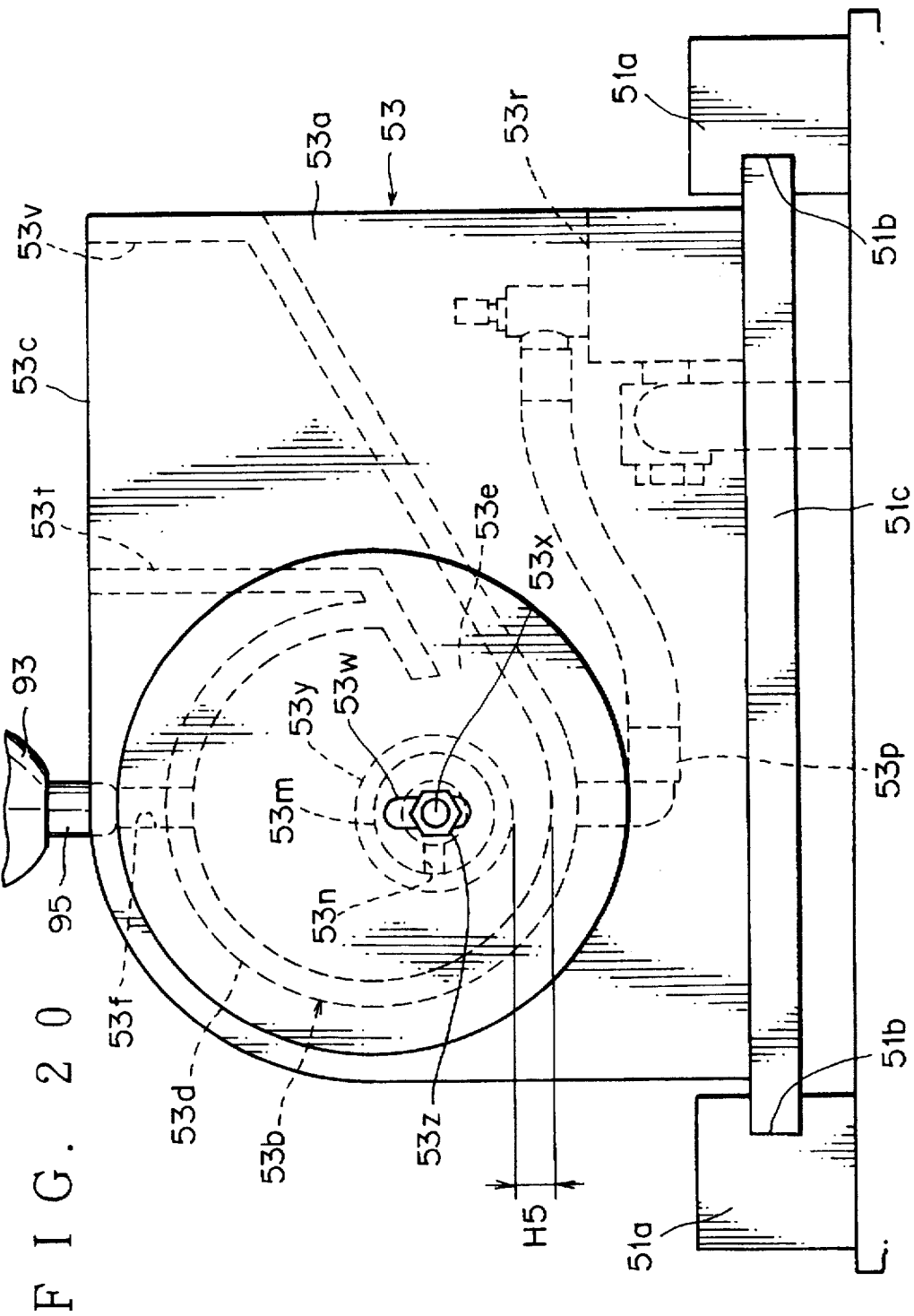
FIG. 20 is an enlarged side view showing a primary portion of an air chamber of a tank main body according to another embodiment of the present invention.

However, as illustrated in FIG. 20 as an enlarged side view for example, the gel-coated seed processing apparatus 1 according to the present invention may be constructed such that the distance H5 between the inner surface of the bottom of the tank main body 53b and the air chamber 53m is adjustable, and the amount of seeds accommodated in the tank main body 53b from the hopper portion 53c of the seed feeding section 5 mainly varies with this distance H5.

Next, brief explanation about the construction of the seed tank 53 in the above-mentioned case will be made. On both side walls 53a of the seed tank 53 are formed vertically extending long holes 53w, and to the both ends of the air chamber 53m mounted in the tank main body 53b across the both side walls 53a are attached blind plates 53y with larger diameter than the air chamber 53m.

Then, a bolt 53x projecting from a substantial center of the long hole 53y is inserted into the air chamber 53m from inside of the both side walls 53a, and a nut 53z is screwed with the end of the air chamber 53m projecting from each of the both side walls 53a to adjust the height H5 of the air chamber 53m by vertically moving the portion of the seed tank 53 in the long hole 53w.

In this case, the blind plate 53y is formed so as to have a diameter capable of thoroughly covering the long hole 53w regardless of the position of the seed tank 53x in the long hole 53w.

Further, in this embodiment, the guide paddles 113b of the gel guide mechanism 113, which guide the coated seeds in the curing agent in the curing vessel 111, are constructed so as to vertically stand on the surface of the belt 113f of the belt cover 113a at regular intervals, however, it is not limited to the belt cover 113a.

Figure 21:
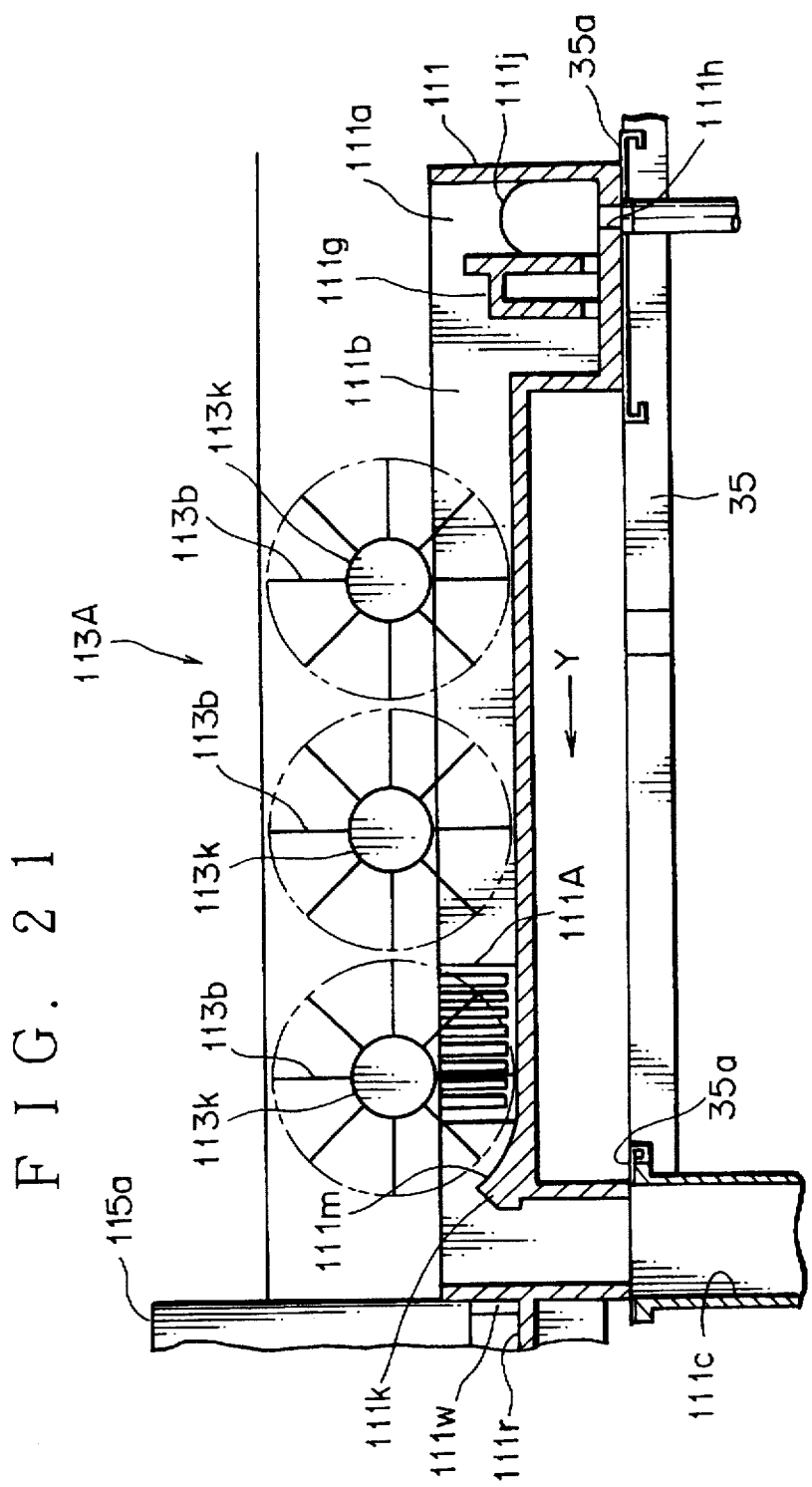
FIG. 21 is an enlarged cross-sectional view of a primary portion of a gel guide mechanism of the gel curing portion illustrated in FIG. 16 according to another embodiment of the present invention.
Figure 22:
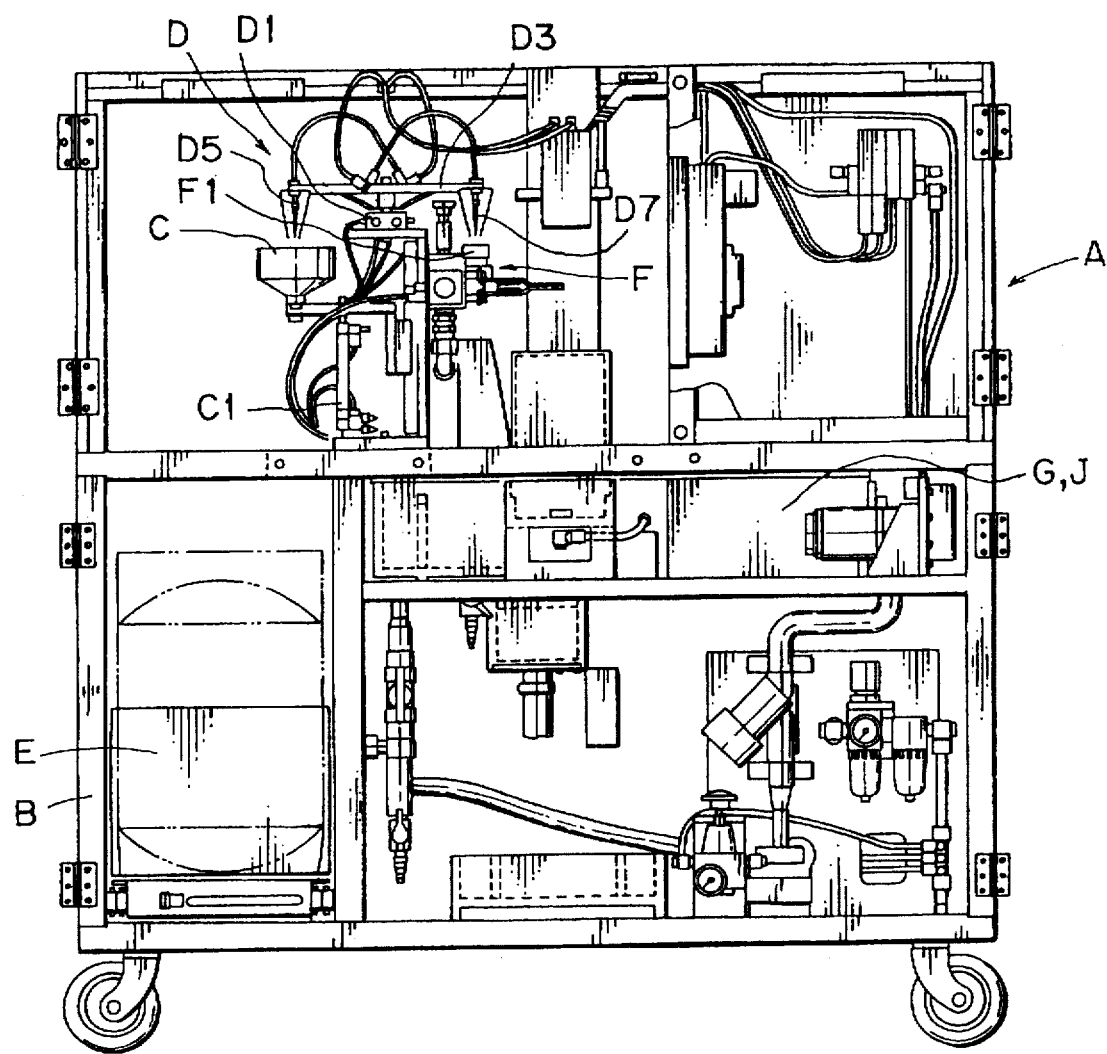
FIG. 22 is a front view showing a conventional gel-coated seed processing apparatus.
Figure 23:
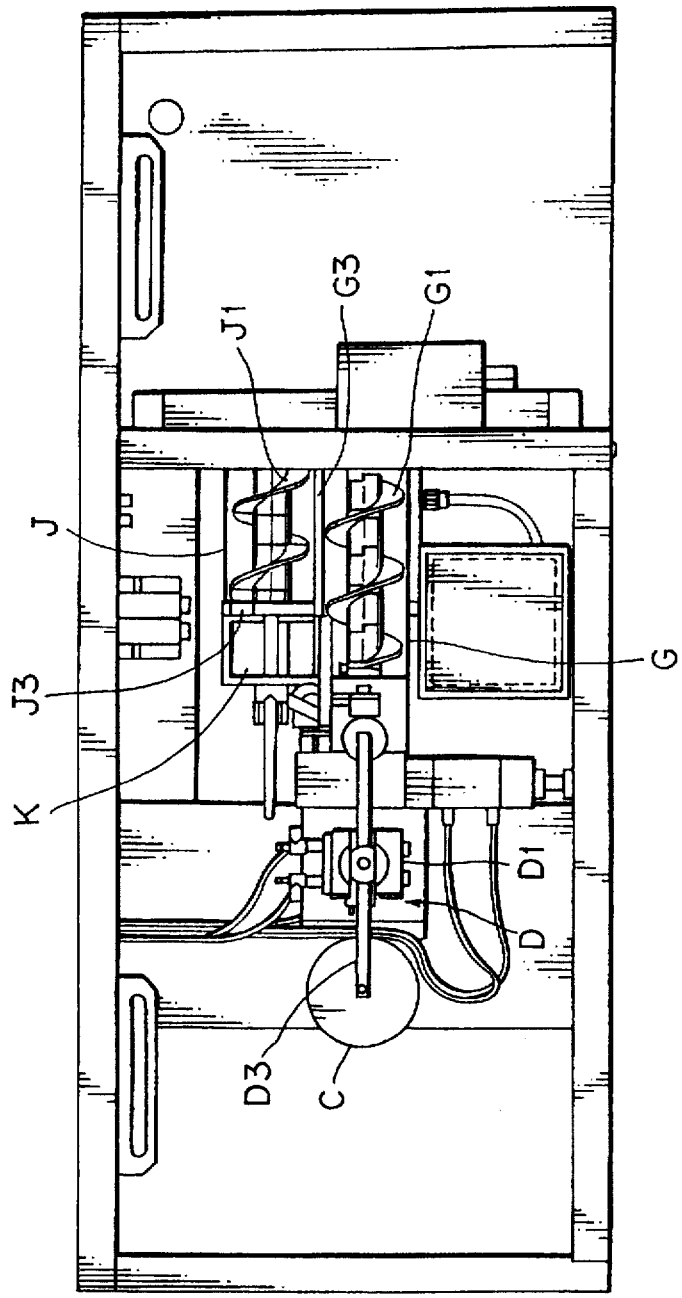
FIG. 23 is a plan view of the conventional gel-coated seed processing apparatus shown in FIG. 22.

For instance, as illustrated in FIG. 21 as an enlarged side cross-sectional view, it is possible to carry out by the gel guide mechanism 113A (corresponding to the gel guide means), in which a plurality of rollers 113k are disposed with dimensions corresponding to the width of the curing vessel 111 in the transverse direction of the gel-coated seed processing apparatus 1 at intervals in the forward and rearward directions of the gel-coated seed processing apparatus 1 above the reaction vessel portion 111b of the curing vessel 111, and the plurality of guide paddles 113b are mounted on the peripheral surface of each of the rollers 113k so as to project in the direction of the diameter thereof at intervals in the direction of the periphery of the roller 113k.

In this case, the guide of the coated seeds in the curing agent in the curing vessel 111 is carried out by the rotation of each of the rollers 113k in such a manner that the guide paddle 113b of each of the rollers 113k is fed into and extracted from the curing agent from the feed vessel portion 111a side to the flushing barrage portion 111k side.

Further, in this embodiment, the gel-coated seed processing apparatus is provided with seed feeding section 5 and the gel washing section 13, however, the present invention may be applied to gel-coated seed processing apparatus in which one of them or both of them are omitted.

Further, in this embodiment, the curing treatment of eight coated seeds at the gel curing section 11 is parallelly carried out in the curing agent in the curing vessel 111 in such a manner that the eight coated seeds are arranged in line in the transverse direction of the gel-coated seed processing apparatus 1, however, the gel curing section 11 may be formed so as to guide the coated seeds by a screw feeder like the gel washing section 13, and the eight coated seeds may be fed one after another at slight intervals for curing treatment.

Further, the number of seeds simultaneously processed at the seed feeding section 5, the gel processing section 7 and the seed transporting section 9 is not limited to eight, but may be less than eight including one, or more than or equal to nine.

[Effects of the Invention]

As explained above, in the gel-coated seed processing method according to the present invention, in which seeds to be processed are substantially linearly transported; the seeds are coated with gelatinizing agent to produce coated seeds at the destination of the transportation; and the coated seeds are substantially linearly transported in curing agent while being immersed therein to harden the coated seeds through reaction with the curing agent to produce gel-coated seeds, the direction that the coated seeds move in the curing agent when observe from above coincides with the direction that the seeds to be transported when observed from above.

As a result, in a horizontal direction and the like crossing the direction that the seeds to be processed are transported when observed from above and the direction that the coated seeds move in the curing agent when observed from above, the transportations of the seeds to be processed and the movements of the coated seeds in the curing vessel are parallelly carried out, which makes it possible to easily accommodate increased capacity of the gel-coated seed processing apparatus.

Further, in the gel-coated seed processing method according to the present invention, after the coated seeds become gel-coated seeds through the reaction with the curing agent, the gel-coated seeds are preferably washed in the washing water while moving in the same direction that the seeds to be processed are transported when observed from upside.

As a result, the direction that the gel-coated seeds move in the washing water coincides with the direction that the seeds to be processed are transported observed from above to unify the three directions, when observed from above, of the transportation of the seeds to be processed, the movement of the coated seeds during curing process, and the transportation of the gel-coated seeds in washing process, so that a close connection of the processes is easily built up, which makes it possible to more easily accommodate increased capacity of the gel-coated seed processing apparatus.

Further, in the gel-coated seed processing method according to the present invention comprises: seed transporting means for at least horizontally and substantially linearly transporting seeds to be processed; gel processing means for coating the seeds to be processed with gelatinizing agent to produce coated seeds at a destination of the seed transporting means and for feeding the coated seeds to curing agent in a curing vessel; gel guide means for at least horizontally and substantially linearly transporting the coated seeds fed from the gel processing means in the curing agent, wherein the gelatinizing agent is hardened through reaction with the curing agent during the transportation by the gel guide means to produce gel-coated seeds, characterized in that: the gel guide means is disposed in relation to the seed transporting means and the gel processing means such that horizontal component of a vector showing movement of the coated seeds caused by the gel guide means coincides with horizontal component of a vector showing movement that the seeds to be processed are transported by the seed transporting means.

As a result, the direction that the seeds to be processed are transported with respect to the gel processing means when observed from above, and the direction that the coated seeds, which are fed from the gel processing means to the curing agent, are moved in the curing agent by the gel guide means are unified to maintain each means in the same direction, which makes it possible to restrict the space for maintaining the apparatus, which is to be prepared around the apparatus, on a prescribed side thereof, so that the installation space for the apparatus can be reduced and the maintenance work for each means can be performed on the prescribed side thereof, resulting in improved maintainability.

Still further, in the gel-coated seed processing method according to the present invention, a plurality of the seed transporting means and a plurality of the gel processing means are juxtaposed in a substantially horizontal direction crossing the horizontal component of the vector showing the direction that the seeds to be processed are transported, and the transportation of the seeds to be processed and the coating of the seeds to be processed with the gelatinizing agent are parallelly carried out.

As a result, the capacity of a series of processes to the coating of the seeds to be processed with the gelatinizing agent at the manufacturing of gel-coated seeds can be increased, resulting in increased capacity of the apparatus itself.

Further, in the gel-coated seed processing method according to the present invention, the curing vessels are formed so as to have the dimension corresponding to the plurality of the seed transporting means for transporting the seeds to be processed and the gel processing means for coating the seeds to be processed with gelatinizing agent in parallel processes, and the gel guide means simultaneously and parallelly transports the plurality of the coated seeds in the direction of the horizontal component of the vector showing the movement that the seeds to be processed are transported by the seed transporting means in the curing vessel.

As a result, in addition to a series of processes to the coating of the seeds to be processed with gelatinizing agent, the curing treatments of the coated seeds can simultaneously and parallelly be conducted, resulting in further increased capacity of the apparatus itself.

Further, in the gel-coated seed processing method according to the present invention, a washing vessel with water therein to which the gel-coated seeds are fed and a second gel guide means for at least horizontally and substantially linearly transporting the gel-coated seeds in the water of the washing vessel are further provided, and the second guide means is disposed in relation to the gel processing means and the gel guide means such that horizontal component of a vector showing movement that the gelatinizing agent is transported by the second guide means coincides with a horizontal component of a vector showing movement that the gelatinizing agent is transported by the guide means as well as the horizontal component of the vector showing the direction that the seeds are transported by the seed transporting means.

As a result, the direction that the seeds to be processed are transported with respect to the gel-processing means when observed from above, the direction that the coated seeds, which are fed from the gel processing means to the curing vessel, are moved by the gel guide means when observed from above, and the direction that the gel-coated seeds are moved in the washing water by the second gel guide means when observed from above can be unified, so that the maintenance work for the seed transporting means, the gel processing means and the gel guide means as well as for the second gel guide means are able to be carried out in the same direction, which contributes to further reduction of the installation space for the apparatus and further improved maintainability.

What is claimed is:

1. A gel-coated seed processing method comprising the steps of:

substantially linearly transporting seeds to be processed:
coating said seeds to be processed with a gelatinization agent at a destination to produce coated seeds;
substantially linearly moving said coated seeds in a curing agent while being immersed in the curing agent such that a direction that said coated seeds is transported in the curing agent when observed from above coincides with a direction that said seeds to be processed are transported when observed from above to harden the coated agent through reaction with the curing agent and obtain gel-coated seeds.

2. The gel-coated seed processing method as claimed in claim 1, wherein after said coated seeds become said gel-coated seeds through reaction with the curing agent, said gel-coated seeds are washed in water while being transported therein in the direction that said seeds to be processed are transported when observed form above.

3. A gel-coated seed processing apparatus comprising:
seed transporting means for at least horizontally and substantially linearly transporting seeds to be processed;
gel processing means cooperating with said seed transporting means for coating said seeds to be processed with a gelatinizing agent to produce coated seeds at a destination of said seed transporting means and for feeding the coated seeds to a curing agent in a curing vessel; and
gel guide means for receiving and at least horizontally and substantially linearly transporting said coated seeds fed from said gel processing means in the curing agent, said gelatinizing agent being hardened through reaction with the curing agent during the transportation by said gel guide means to produce gel-coated seeds, wherein said gel guide means is disposed in relation to said seed transporting means and said gel processing means such that the direction of movement of said coated seeds caused by said gel guide means coincides with the direction of movement that said seeds to be processed are transported by said seed transporting means.

4. The gel-coated seed processing apparatus as claimed in claim 3, wherein a plurality of said seed transporting means and a plurality of said gel processing means are parallelly disposed and juxtaposed in a substantially horizontal direction crossing said direction of movement that said seeds to be processed are transported.

5. The gel-coated seed processing apparatus as claimed in claim 4, wherein curing vessels are disposed at suitable intervals in a substantially horizontal direction crossing the direction of movement that said seeds to be processed are transported, and have a dimension capable of accommodating a plurality of said coated seeds which are simultaneously fed, and said gel guide means simultaneously and parallelly transports said plurality of said coated seeds, which are situated at suitable intervals in said substantially horizontal direction, in the curing vessel.

6. The gel-coated seed processing apparatus as claimed in claim 3, further comprising a washing vessel for containing washing water therein to which said gel-coated seeds are fed, and second gel guide means for at least horizontally and substantially linearly transporting said gel-coated seeds in the washing vessel, wherein said second guide means is disposed in relation to said gel processing means and said gel guide means such that the direction of movement that the gelatinizing agent is transported by said second guide means coincides with the direction of movement that the gelatinizing agent is transported by the guide means as well as the direction of movement that the seeds are transported by the seed transporting means.

7. The gel-coated seed processing apparatus as claimed in claim 4, further comprising a washing vessel for containing washing water therein to which said gel-coated seeds are fed, and second gel guide means for at least horizontally and substantially linearly transporting said gel-coated seeds in the washing vessel, wherein said second guide means is disposed in relation to said gel processing means and said gel guide means such that the direction of movement that the gelatinizing agent is transported by the second guide means coincides with the direction of movement that the gelatinizing agent is transported by the guide means as well as the the direction of movement that the seeds are transported by the seed transporting means.

* * * * *